US012598645B2

(12) United States Patent
Xin et al.

(10) Patent No.: US 12,598,645 B2
(45) Date of Patent: Apr. 7, 2026

(54) RECEIVE REORDERING BUFFER CONTROL FOR LATENCY SENSITIVE TRAFFIC

(71) Applicants: SONY GROUP CORPORATION, Tokyo (JP); SONY CORPORATION OF AMERICA, New York, NY (US)

(72) Inventors: Liangxiao Xin, Santa Clara, CA (US); Mohamed Abouelseoud, Burlingame, CA (US); Li-Hsiang Sun, San Jose, CA (US); Qing Xia, San Jose, CA (US)

(73) Assignees: SONY GROUP CORPORATION, Tokyo (JP); SONY CORPORATION OF AMERICA, New York, NY (US)

( * ) Notice: Subject to any disclaimer, the term of this patent is extended or adjusted under 35 U.S.C. 154(b) by 603 days.

(21) Appl. No.: 18/067,972

(22) Filed: Dec. 19, 2022

(65) Prior Publication Data

US 2023/0199846 A1     Jun. 22, 2023

Related U.S. Application Data

(60) Provisional application No. 63/265,713, filed on Dec. 20, 2021.

(51) Int. Cl.
*H04W 74/0816* (2024.01)
*H04L 1/1607* (2023.01)
*H04L 5/00* (2006.01)

(52) U.S. Cl.
CPC ....... *H04W 74/0816* (2013.01); *H04L 1/1621* (2013.01); *H04L 5/0055* (2013.01)

(58) Field of Classification Search
CPC .............. H04W 74/0816; H04W 84/12; H04L 1/1621; H04L 5/0055; H04L 1/1841;
(Continued)

(56) References Cited

U.S. PATENT DOCUMENTS

2004/0143681 A1*  7/2004  Benveniste ........... H04W 24/00
                                                    370/328
2009/0086657 A1*  4/2009  Alpert ................... H04L 1/1877
                                                    370/310
(Continued)

FOREIGN PATENT DOCUMENTS

RU          2816579 C2 *  4/2024  ............ H04W 48/12
TW      200807992 A  *  2/2008  ........... H04L 1/1877
(Continued)

OTHER PUBLICATIONS

Undugodage, Salitha Priyanka et al., "Achieving Transmission Fairness in Distributed Medium Access Wireless Mesh Networks: Design Challenges, Guidelines and Future Directions", International Journal of Wireless & Mobile Networks, vol. 5, No. 3, Jun. 2013, pp. 1-17.

*Primary Examiner* — Kwang B Yao
(74) *Attorney, Agent, or Firm* — O'BANION & RITCHEY LLP; John P. O'Banion

(57) ABSTRACT

A wireless communication apparatus, method or protocol for wireless STAs using CSMA/CA on a wireless local area network (WLAN). A receiver STA receives MSDUs or A-MSDUs which include an expiration time, from a transmitter STA. The receiver STA stores the MSDUs or A-MSDUs with expiration time in its receive reordering buffer of the corresponding high-throughput (HT)-immediate block acknowledgement (Ack) agreement. The receiver STA passes the MSDU or A-MSDU to a next MAC process before an expiration time of the MSDU or A-MSDU. Thus, the percentage of latency sensitive traffic packets being communicated prior to expiration is increased.

22 Claims, 28 Drawing Sheets

(58) Field of Classification Search
CPC ... H04L 1/1635; H04L 1/1838; H04L 1/1848;
H04L 69/24
See application file for complete search history.

(56) References Cited

U.S. PATENT DOCUMENTS

| | | | | |
|---|---|---|---|---|
| 2012/0082096 A1* | 4/2012 | Cave | .................... | H04W 24/10 |
| | | | | 370/328 |
| 2018/0213566 A1* | 7/2018 | Baron | ................ | H04W 72/569 |
| 2019/0097952 A1 | 3/2019 | Yong | | |
| 2020/0037288 A1* | 1/2020 | Huang | ................. | H04W 72/30 |
| 2020/0403928 A1 | 12/2020 | Amend | | |
| 2021/0111836 A1 | 4/2021 | Po-Kai | | |
| 2021/0195683 A1 | 6/2021 | Xin | | |

FOREIGN PATENT DOCUMENTS

| | | | | | |
|---|---|---|---|---|---|
| WO | WO-2021011476 A1 * | 1/2021 | ........... | H04W 76/15 |
| WO | WO-2021126075 A1 | 6/2021 | | |
| WO | WO-2022032150 A1 * | 2/2022 | ........... | H04W 84/12 |

* cited by examiner

AAD Construction for PV0 MPDU
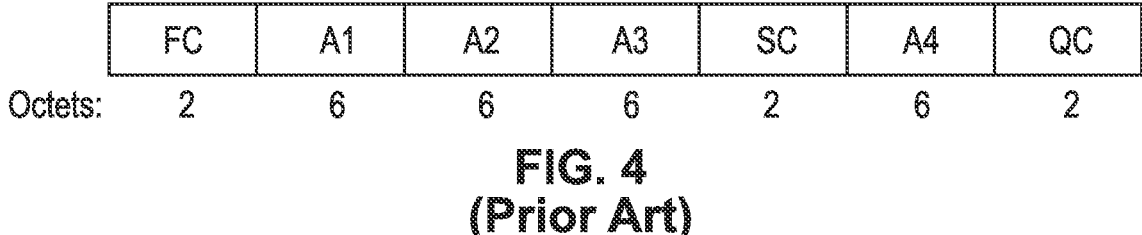
| FC | A1 | A2 | A3 | SC | A4 | QC |
|----|----|----|----|----|----|----|
| 2  | 6  | 6  | 6  | 2  | 6  | 2  |
Octets:
FIG. 4
(Prior Art)
Nonce Field
| Nonce Flags | STA or MLD MAC Address Identified by A2 | PN |
|-------------|-----------------------------------------|----|
| 1           | 6                                       | 6  |
Octets:
FIG. 5
(Prior Art)
Nonce Flags Subfield
B0      B3          B4          B5    B6      B7
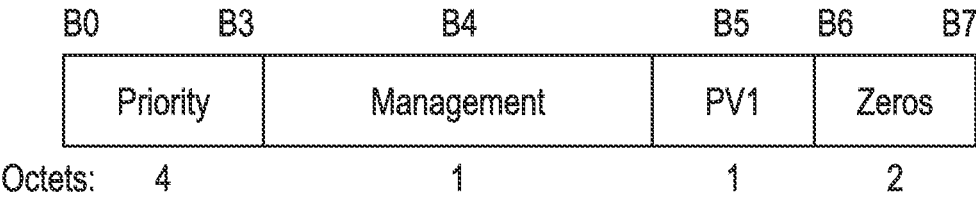
| Priority | Management | PV1 | Zeros |
|----------|------------|-----|-------|
| 4        | 1          | 1   | 2     |
Octets:
FIG. 6
(Prior Art)

SCS Descriptor Element

| Element ID | Length | SCSID | Request Type | Intra-Access Category Priority Element (optional) | TCLAS Elements (optional) | TCLAS Processing Element (optional) | TSPEC Element (optional) | Optional Subelements |
|---|---|---|---|---|---|---|---|---|
| 1 | 1 | 1 | 1 | 0 or 3 | variable | 0 or 3 | 0 or 57 | variable | zero or more TCLAS Elements

Octets:

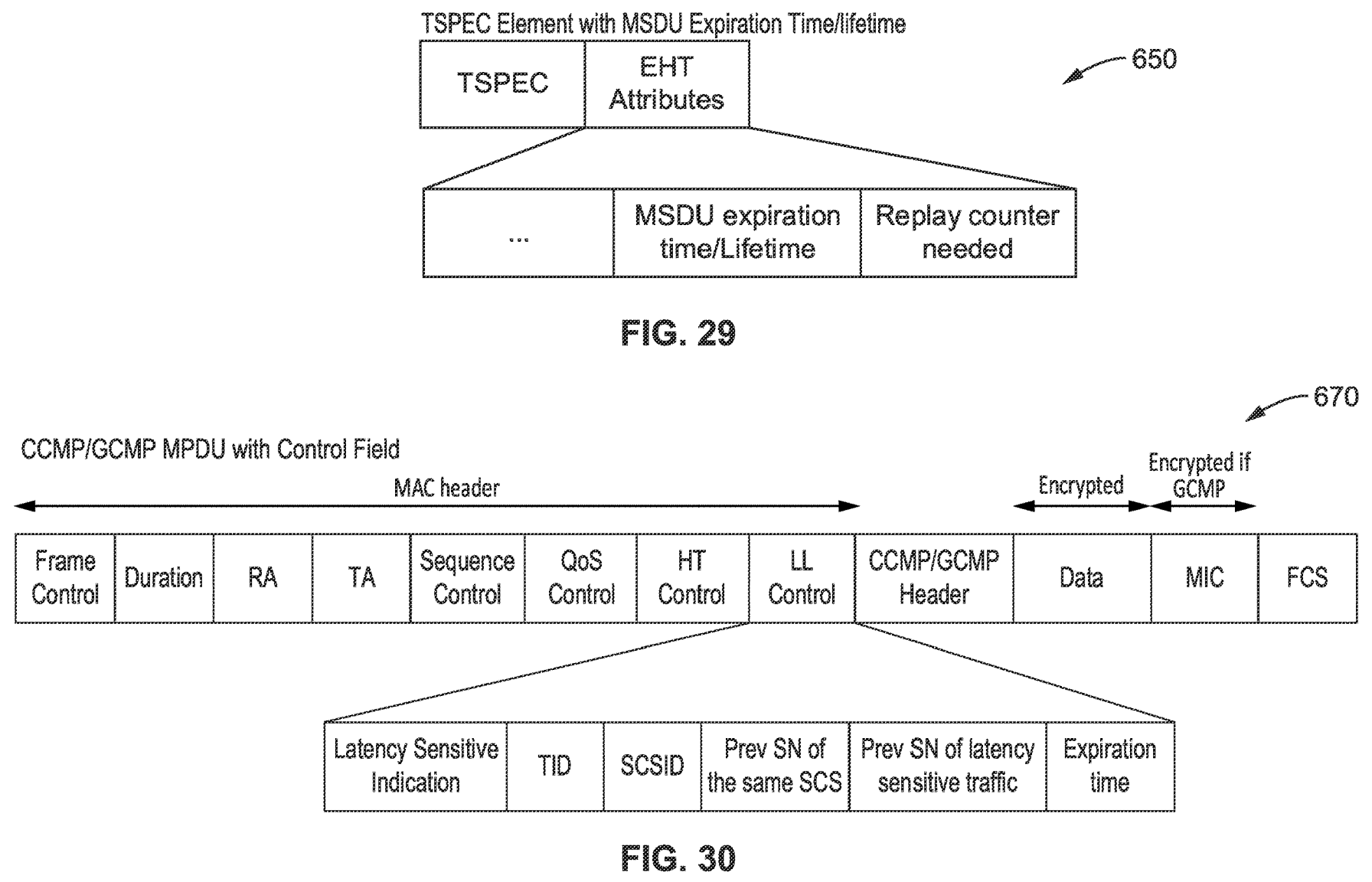

TSPEC Element with MSDU Expiration Time/lifetime

| TSPEC | EHT Attributes |
|---|---|

| ... | MSDU expiration time/Lifetime | Replay counter needed |
|---|---|---|

CCMP/GCMP MPDU with Control Field

MAC header

| Frame Control | Duration | RA | TA | Sequence Control | QoS Control | HT Control | LL Control | CCMP/GCMP Header | Data | MIC | FCS |
|---|---|---|---|---|---|---|---|---|---|---|---|

Encrypted

Encrypted if GCMP

| Latency Sensitive Indication | TID | SCSID | Prev SN of the same SCS | Prev SN of latency sensitive traffic | Expiration time |
|---|---|---|---|---|---|

FIG. 30

AAD Construction for PV0 MPDU with LL Control Field

950

| FC | A1 | A2 | A3 | SC | A4 | QC | LC |
|----|----|----|----|----|----|----|----|

Nonce Field for MPDU with LL Control Field

970

| Nonce Flags | STA MAC/MLD Address Identified By A2 | PN | SCSID |
|-------------|--------------------------------------|----|-------|

RECEIVE REORDERING BUFFER CONTROL FOR LATENCY SENSITIVE TRAFFIC

CROSS-REFERENCE TO RELATED APPLICATIONS

This application claims priority to, and the benefit of, U.S. provisional patent application Ser. No. 63/265,713 filed on Dec. 20, 2021, incorporated herein by reference in its entirety.

STATEMENT REGARDING FEDERALLY SPONSORED RESEARCH OR DEVELOPMENT

Not Applicable

NOTICE OF MATERIAL SUBJECT TO COPYRIGHT PROTECTION

BACKGROUND

1. Technical Field

The technology of this disclosure pertains generally to the receive reordering buffer in High-Throughput (HT) wireless communications under IEEE802.11, and more particularly to negotiating and indicating MSDU and A-MSDU expiration times.

2. Background Discussion

Current wireless technologies using Carrier-Sense Multiple Access/Collision Avoidance (CSMA/CA) focus on high throughput performance of the network but does not have low latency capability. However, a large number of applications, such as Real-Time Applications (RTA), require low latency, and thus a technology gap arises.

A RTA requires low latency communication and uses best effort communication. The data generated from a RTA is called latency sensitive traffic; while the data generated from the non-time sensitive application is called regular traffic.

The data is passed to the MAC layer of the transmitter station (STA) in the format of a Medium Access Control (MAC) Service Data Units (MSDUs) or Aggregated MSDU (A-MSDU) and is assigned a sequence number for duplication detection and recovery. The transmitter STA encapsulates MSDU or A-MSDU as MPDU (or A-MPDU) that can be carried in the frame. Then, the transmitter STA can transmit a packet carrying the frame(s) to the receiver STA over the channel. After the receiver STA receives the packet over the channel, it passes the frames in the packets to its MAC layer and decodes the MSDUs and A-MSDUs at its MAC layer.

The latency sensitive traffic requires low latency due to its high timeliness requirement on the delivery. Therefore, the MSDU or A-MSDU of latency sensitive traffic is valid when it is delivered within a certain period of time, or before its expiration time.

IEEE 802.11 uses a block Ack mechanism to improve channel efficiency. The STA which sends data is denoted as the transmitter STA and the STA which receives data is denoted as the receiver STA. The transmitter STA and the receiver STA can have a block Ack agreement to use block Ack mechanism between them. When the block Ack mechanism is used, the receiver STA can integrate multiple acknowledgements into one frame (e.g., an BA frame) to indicate the success or failure of the corresponding transmissions.

When the Block Ack (BA) mechanism, such as a High-Throughput (HT) immediate block Ack, is used, the receiver STA maintains a receive reordering buffer control per Transmit Address (TA)/Traffic Identifier (TID)—(TA/TID). That is, the receiver STA maintains a receive reordering buffer control for a TID traffic from a transmitter STA (TA). The receive reordering buffer is used for reordering MSDUs and A-MSDUs and the receiver STA shall always pass MSDUs or A-MSDUs to the next MAC process in order of increasing sequence number subfield value.

BRIEF SUMMARY

A mechanism is described for increasing the amount of latency sensitive traffic packets that can be communicated, over an 802.11 network using CSMA/CA, prior to their expiration. Wireless stations (STAs) are either Access Points (APs), or non-AP STAs, in the roles of either a transmitter STA or receiver STA, for communicating frames between medium-access control (MAC) layers. A receiver STA receives at least one MAC service data unit (MSDU) or an aggregated-MSDU (A-MSDU) with expiration time successfully from another STA operating as the transmitter STA. The MSDU or A-MSDU is stored by the receiver with an expiration time (in various forms) in its receive reordering buffer of the corresponding high-throughput (HT)-immediate block acknowledgement (Ack) agreement. The MSDU or A-MSDU is passed to a next MAC process before the expiration time of the MSDU or A-MSDU.

In at least one embodiment/mode/option, the transmitter and receiver perform a negotiation regarding the expiration of the MSDU or A-MSDU of a traffic stream, prior to the transmission of that MSDU or A-MSDU. The expiration time may incorporated (embedded) in the corresponding MPDU by the transmitter STA for receipt by the receiving STA. The expiration time of the MSDU or A-MSDU may be expressed in various formats, described in detail in the present disclosure.

The receive reordering buffer can store MSDU and A-MSDUs with or without the expiration value in the same buffer. Various configurations can be set to determine the conditions under which the MSDUs and/or A-MSDUs are passed to the next MAC.

Further aspects of the technology described herein will be brought out in the following portions of the specification, wherein the detailed description is for the purpose of fully disclosing preferred embodiments of the technology without placing limitations thereon.

BRIEF DESCRIPTION OF THE DRAWINGS

The technology described herein will be more fully understood by reference to the following drawings which are for illustrative purposes only:

FIG. 4 is a data field diagram of depict AAD construction for PV0 MPDUs.

FIG. 5 is a data field diagram of Nonce.

FIG. 6 is a data field diagram of Nonce flag subfields.

FIG. 16 is a data field diagram of an SCS descriptor element.

FIG. 29 is a data field diagram of a TSPEC element with an MSDU expiration time/lifetime field, according to at least one embodiment of the present disclosure.

FIG. 30 is a data field diagram of a CCMP/GCMP MPDU (CCMP MPDU or GCMP MPDU) with LL control field, according to at least one embodiment of the present disclosure.

DETAILED DESCRIPTION

1. Current Wireless Technologies

1.1. Receive Reordering Buffer Control

Figure 1:
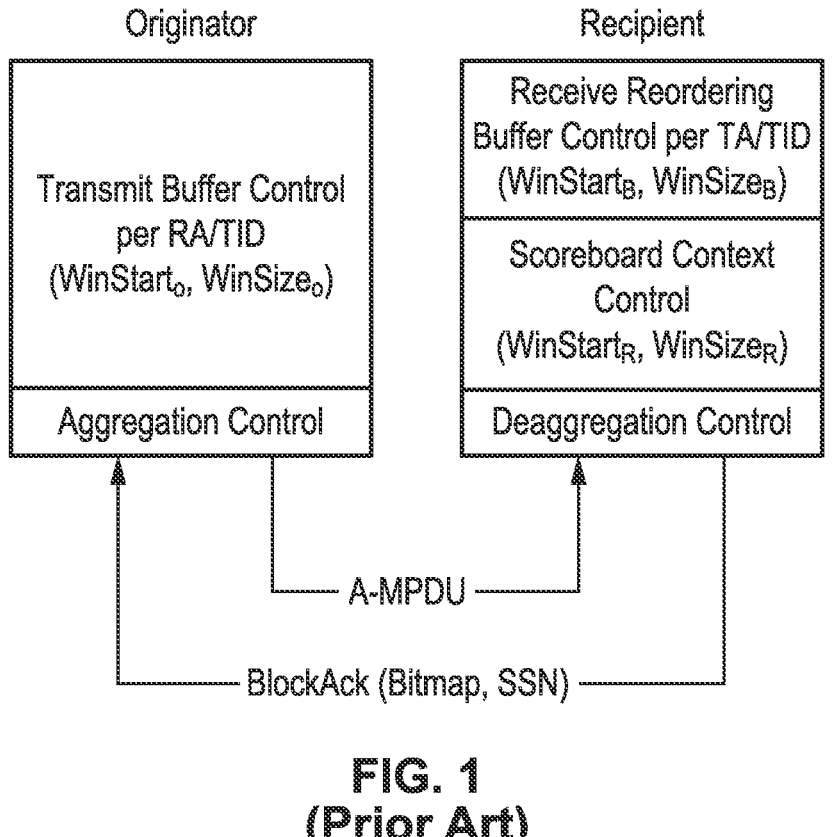
FIG. 1 is a High-Throughput (HT)-immediate block Ack (BA) architecture of IEEE 802.11.

FIG. 1 depicts a High-Throughput (HT)-immediate block Ack (Bitmap, SSN) architecture of IEEE 802.11 (under Draft P802.11REVmd_D5.0), with originator as transmit buffer control per RA/TID (WinStart0, WinSizet0) having aggregation control, and the recipient contains a receive reordering buffer control per Transmit Address (TA) or Traffic Identifier (TID) (WinStartB, WinSizetB), which is responsible for passing the Medium Access Control (MAC) Service Data Units (MSDUs) or Aggregated-MSDUs (A-MSDUs) to the next MAC process in order of increasing sequence number of the MSDUs or A-MSDUs and detecting the duplicated MSDUs and A-MSDUs (i.e., MSDUs and A-MSDUs with the same sequence number).

A receive reordering buffer is maintained for each HT-immediate block Ack agreement to buffer MSDUs or A-MSDUs of the same TA/TID that have been received, but have not yet been passed to the next MAC process.

A receive reordering buffer shall be maintained for each HT-immediate block ack agreement. Each receive reordering buffer includes a record comprising the following: (a) Buffered MSDUs or A-MSDUs that have been received, but not yet passed to the next MAC process. (b) A WinStartB parameter, indicating the value of the Sequence Number subfield of the first (in order of ascending sequence number) MSDU or A-MSDU that has not yet been received. (c) A WinEndB parameter, indicating the highest sequence number expected to be received in the current reception window. (d) A WinSizeB parameter, indicating the size of the reception window.

1.2. CCMP Encapsulation and Decapsulation

CTR with CBC-MAC protocol (CCMP) provides data confidentiality, authentication, integrity, and replay protection in an IEEE 802.11 network.

Figure 2:
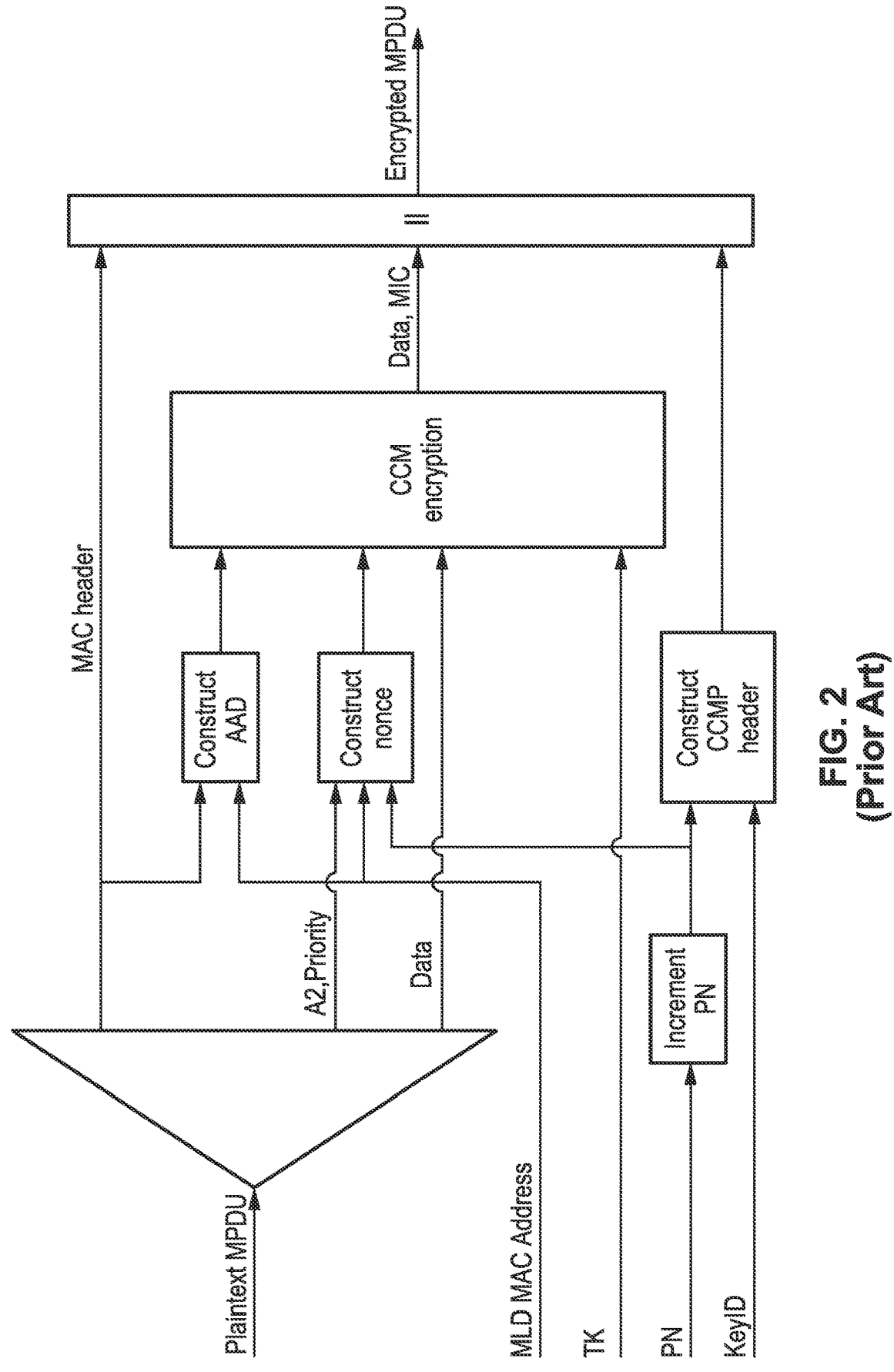
FIG. 2 is a block diagram of CCMP encapsulation process.
Figure 3:
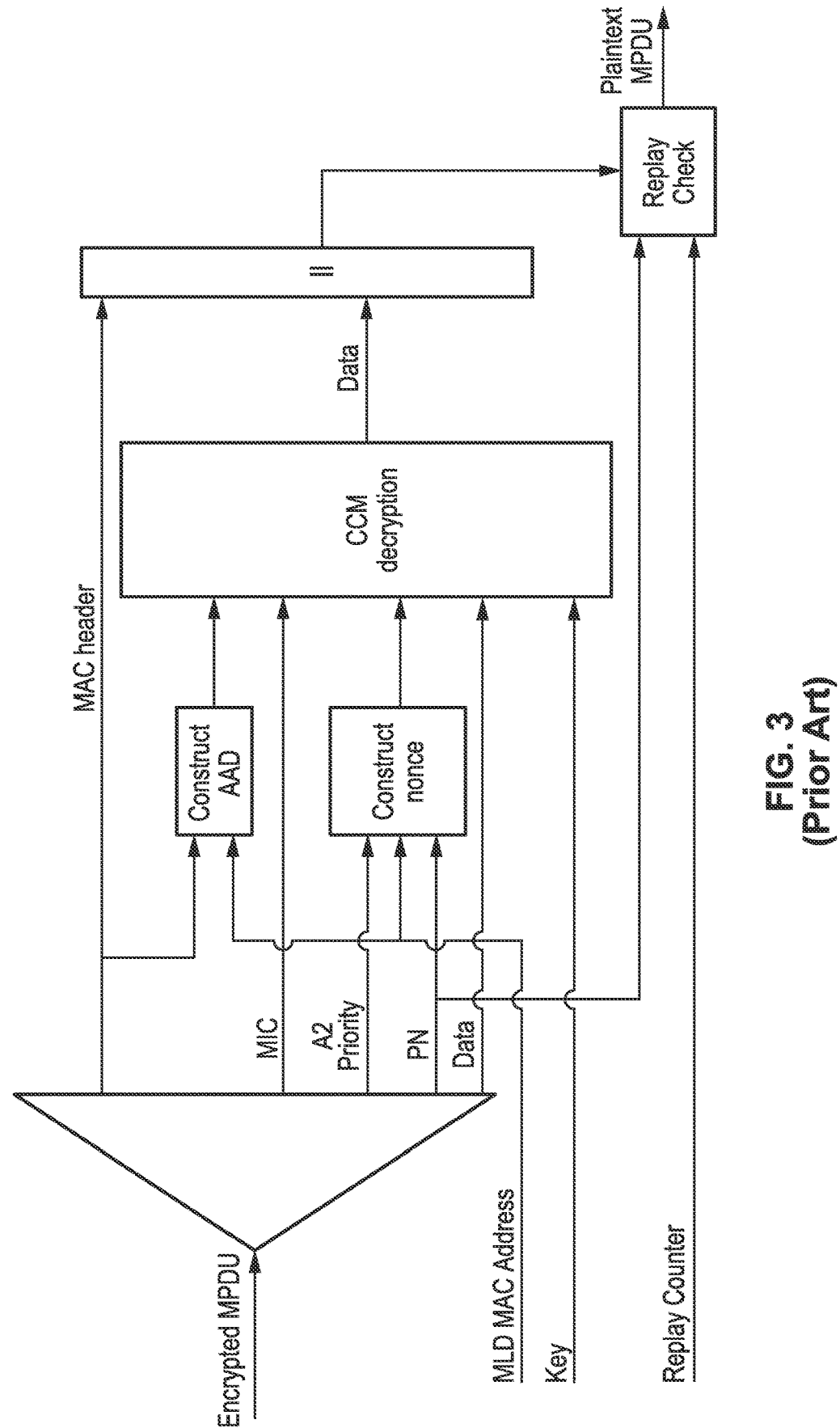
FIG. 3 is a block diagram of CCMP decapsulation process.

FIG. 2 and FIG. 3 depict the CCMP encapsulation process and the CCMP decapsulation process, respectively. In FIG. 2 a plaintext MPDU is shown being received with outputs of MAC header, A2, Priority and Data to a Construct AAD, Construct nonce and CCM Encryption blocks, respectively. With output Data, MIC from CCM encryption to block II outputting an Encrypted MPDU. In FIG. 3 an encrypted plaintext MPDU is shown being received with outputs of MAC header, A2, Priority, PN and Data to a Construct AAD, Construct nonce and CCM Encryption blocks, respectively. With output Data from CCM decryption to block II outputting a Replay Check block outputting Plaintext MPDU.

FIG. 4 and FIG. 5 depict the additional authentication data (AAD) field construction for PV0 MPDUs, and nonce, respectively. During those CCMP processes, AAD and nonce, whose formats will be constructed for CCM encryption and decryption in IEEE 802.11be. The AAD construction for PV0 MPDUs field is shown with subfields, FC, A1-A3, SC, A4 and QC. The nonce field is shown with Nonce Flags, STA or MLD MAC Address identified by A2, and PN.

FIG. 6 depicts nonce flag subfields shown as Priority, Management, PV1 and Zeroes.

When a STA uses CCMP to encrypt a MPDU, it increments the packet number (PN) to obtain a fresh PN for the MPDU so that the PN of the MPDU is unique.

When a STA uses CCMP to encrypt a MPDU, the MPDU will be encapsulated as a CCMP MPDU, whereby a CCMP header is added.

When STA decrypts a CCMP MPDU, it can extract the PN from the CCMP header of the CCMP MPDU. The STA shall maintain a separate set of replay counters for each PTKSA, GTKSA and protocol version value. For each PTKSA, GTKSA, and protocol version value, the recipient shall maintain a separate replay counter for each TID. The STA discards any replayed MPDUs, such as are received with a PN less than or equal to the value of the corresponding replay counter that is associated with the MPDU.

1.3. CCMP MPDU Format

Figure 7:
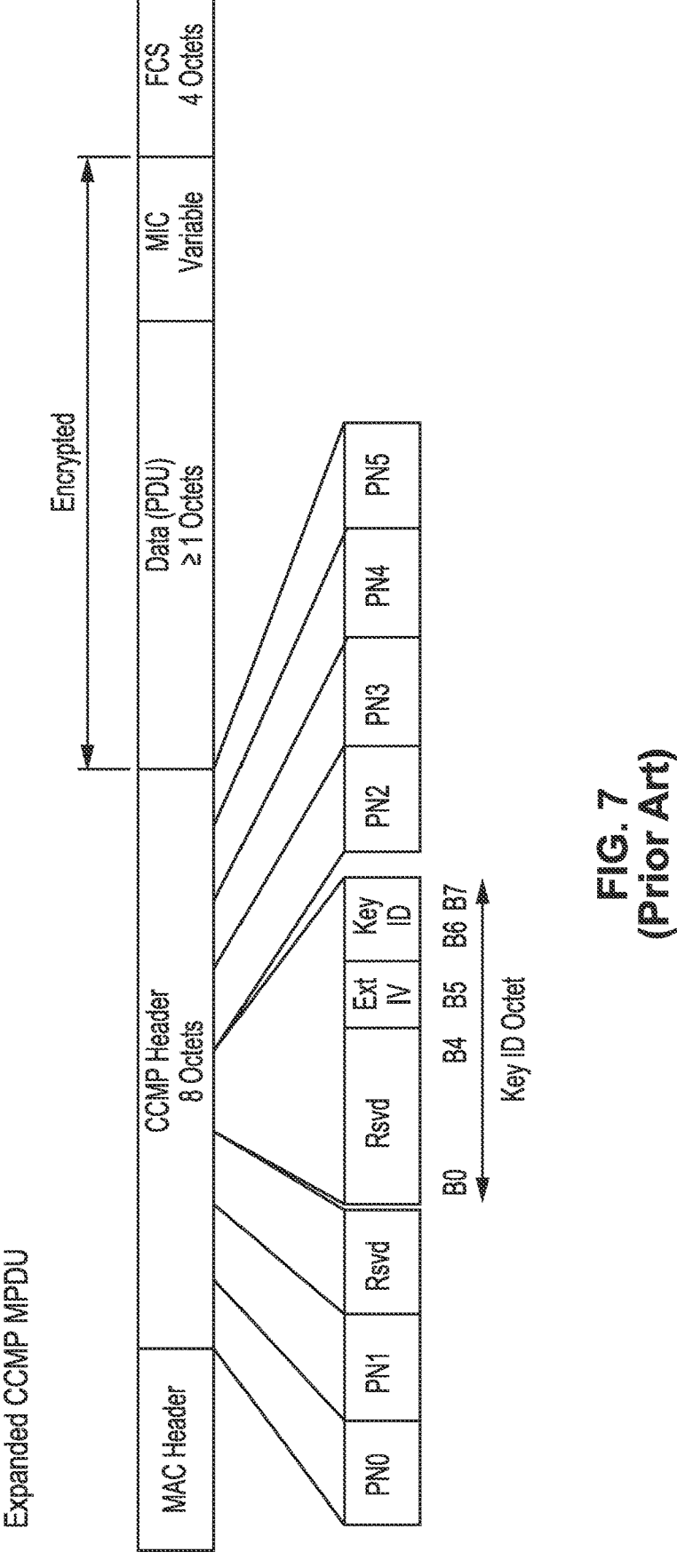
FIG. 7 is a data field diagram of CCMP MPDU.

FIG. 7 depicts the format of CCMP MPDU, having fields of MAC Header, CCMP Header, Data, MIC, and FCS. The CCMP field contains the following subfields of PN0, PN1, Reserved, Ext IV, Key ID, PN2-PN5.

Compared with the regular MPDU format in IEEE 802.11, a CCMP header is added between the MAC header and the frame body (data). Meanwhile, a MIC field is added between data and FCS. The CCMP header and MIC are constructed during the CCMP encryption process as shown in the previous slide. The data and MIC are encrypted in the CCMP MPDU.

1.4. GCMP Encapsulation and Decapsulation

GCM protocol (GCMP) provides data confidentiality, authentication, integrity, and replay protection in an IEEE 802.11 network.

Figure 8:
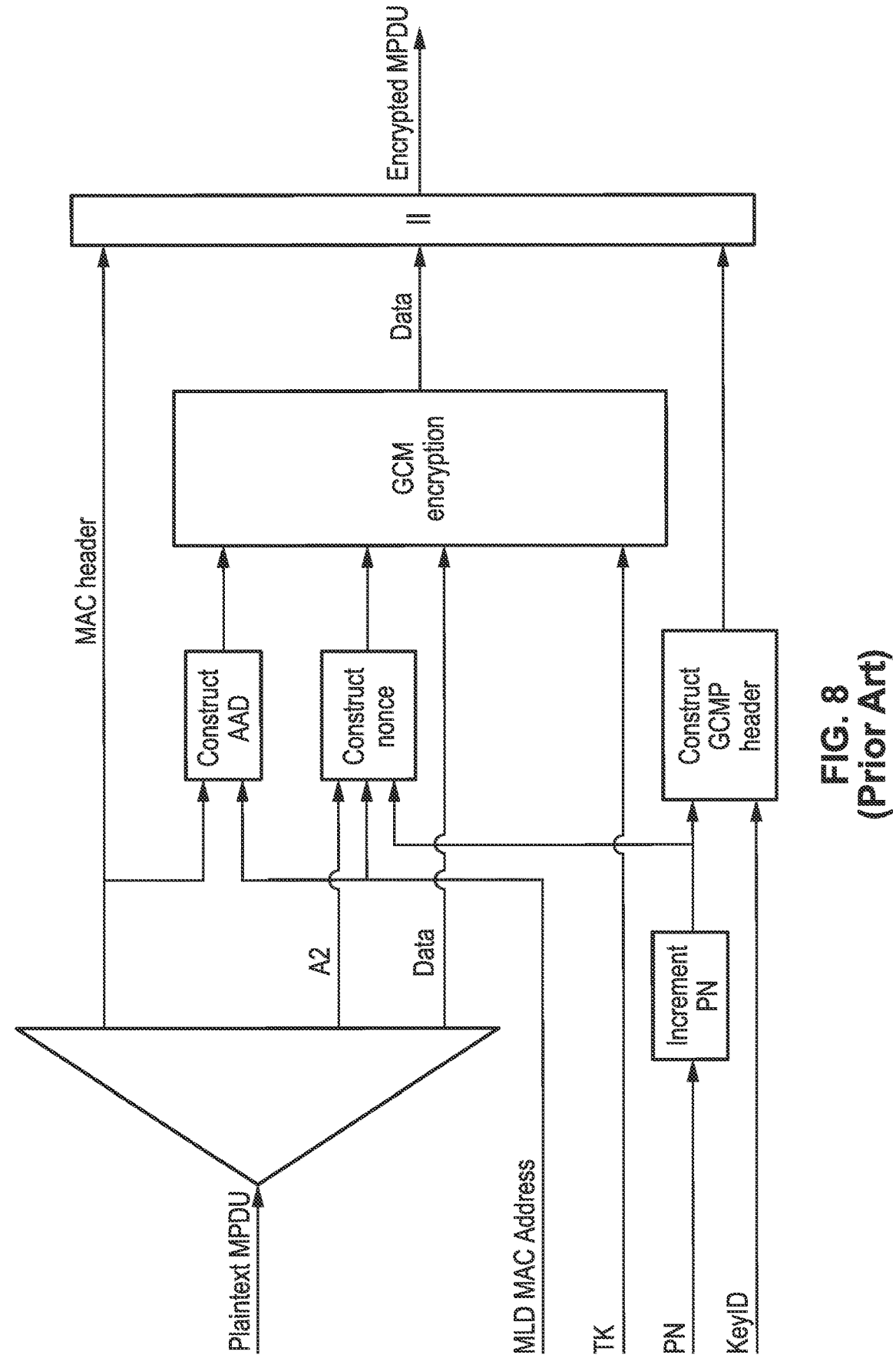
FIG. 8 is a block diagram of GCMP Encapsulation.
Figure 9:
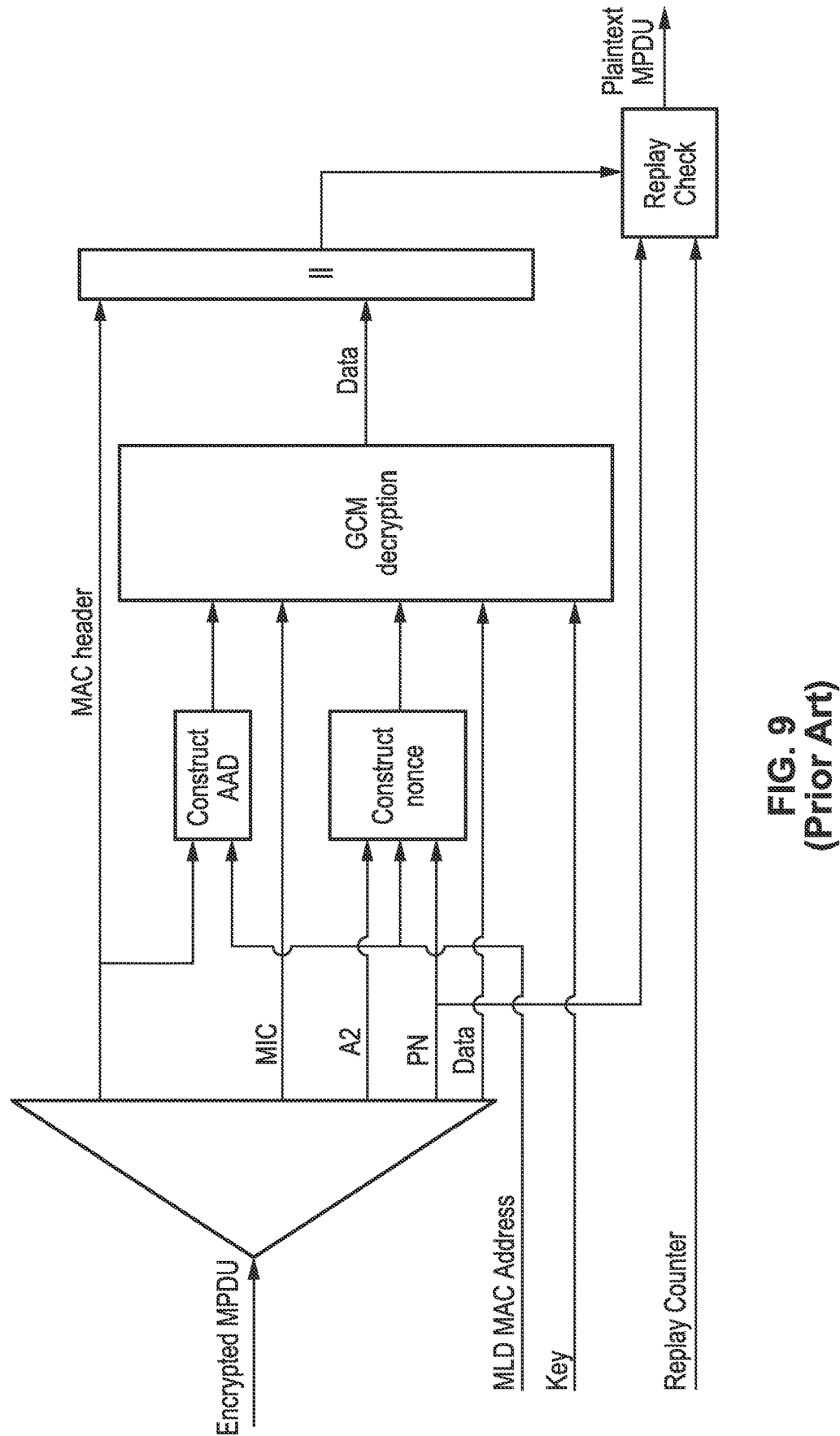
FIG. 9 is a block diagram of GCMP Decapsulation.
Figures 10, 11:
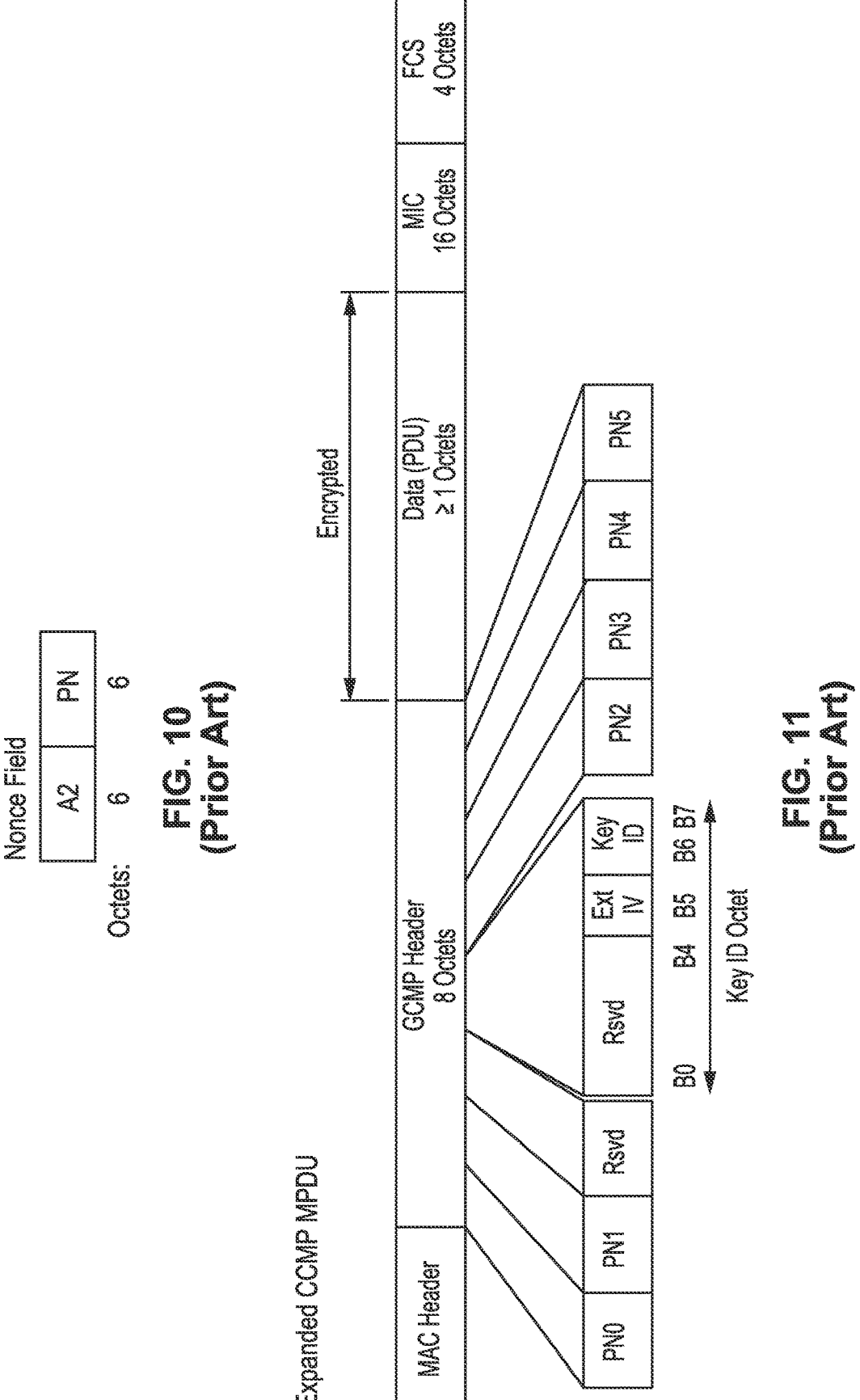
FIG. 10 is a data field diagram of the nonce subfields.
FIG. 11 is a data field diagram of a GCMP MPDU frame.

FIG. 8 and FIG. 9 depict the GCMP encapsulation and decapsulation process. During those processes, AAD and nonce, whose formats are shown in FIG. 4, FIG. 5 and FIG. 10 will be constructed for GCM encryption and decryption in IEEE 802.11be.

When STA uses GCMP to encrypt a MPDU, it increments the packet number (PN) to obtain a fresh PN for the MPDU so that the PN of the MPDU is unique.

When STA uses GCMP to encrypt a MPDU, the MPDU will be encapsulated as a GCMP MPDU, whereby a GCMP header is added.

When a STA decrypts a GCMP MPDU, it extracts the PN from the GCMP header of the GCMP MPDU. The STA shall maintain a separate set of replay counters for each PTKSA, GTKSA and protocol version value. For each PTKSA, GTKSA, and protocol version value, the recipient shall maintain a separate replay counter for each TID. The STA discards any replayed MPDUs, such that are received with PN less than or equal to the value of the corresponding replay counter that is associated with the MPDU.

1.5. GCMP MPDU Format

FIG. 11 depicts the format of a GCMP MPDU. Compared with the regular MPDU format in IEEE 802.11, a GCMP header is added between the MAC header and the frame body (data). Meanwhile, a MIC field is added between data and FCS. The GCMP header and MIC are constructed during the GCMP encryption process as previously shown. The data is encrypted in the CCMP MPDU.

1.6. SCS

Figure 12:
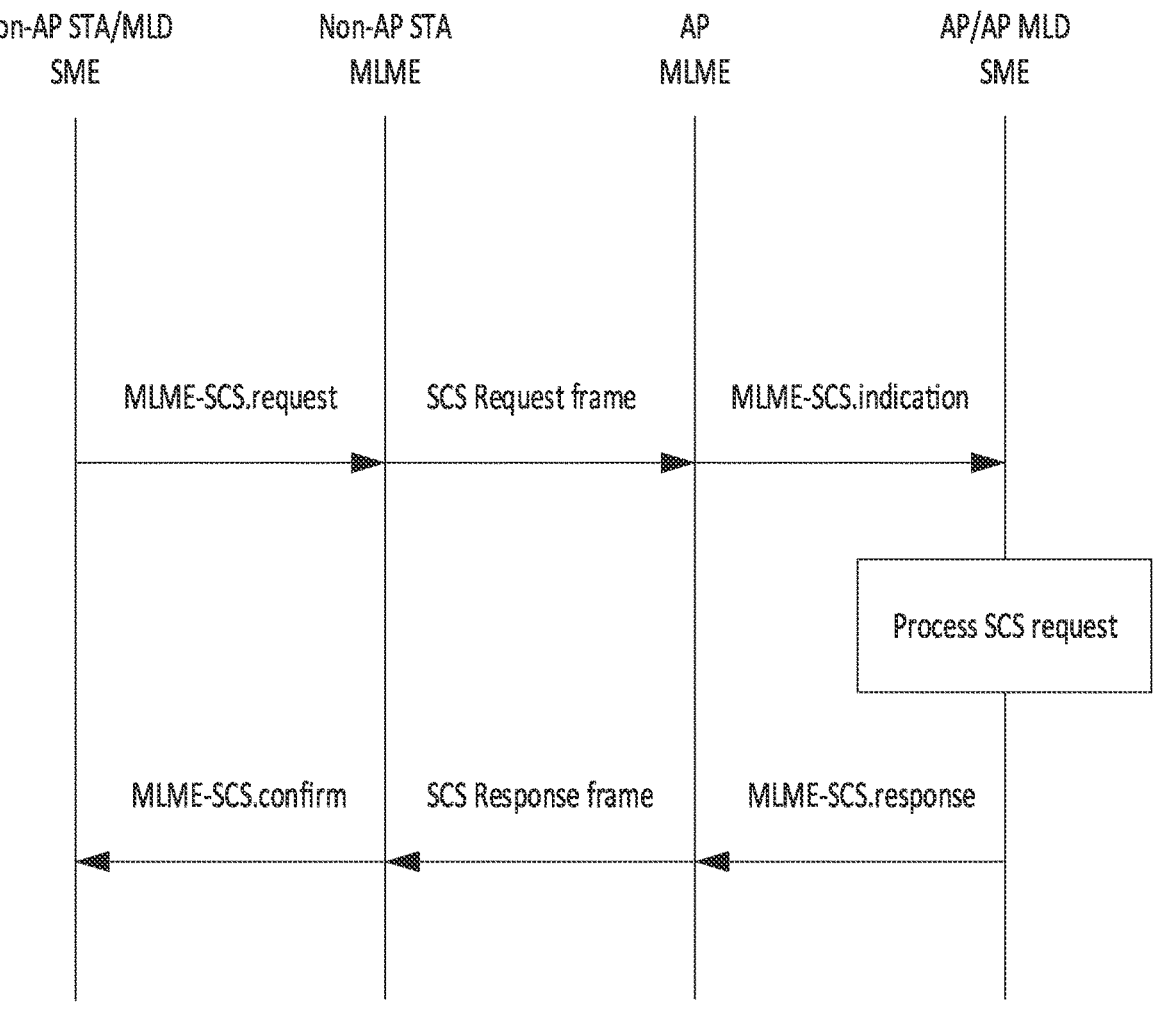
FIG. 12 is an interworking model of a SCS setup defined in IEEE 802.11be.

FIG. 12 depicts an example of a SCS setup defined in IEEE 802.11be (Draft P802.11be_D1.1). The interworking model of the STAs can be the same as defined in IEEE 802.11 standard.

The non-AP STA decides to initiate a SCS setup procedure the AP. The Station Management Entity (SME) of the non-AP STA sends a MLME-SCS.request message to its MAC Sublayer Management Entity (MLME). When the MLME of the non-AP STA receives the MLME-SCS.request message, it collects the information in the MLME-SCS.request message and sends a SCS request frame to the AP. The MLME of the AP receives the frame and generates a MLME-SCS.indication message to its SME.

Then, the SME of the AP sends an MLME-SCS.response message containing SCS setup result to its MLME. Then, the MLME of the AP sends a SCS response frame to the non-AP STA. The MLME of the non-AP STA receives the frame and sends an MLME-SCS.confirm message to its SME. Then, the non-AP recognizes (knows) whether the SCS setup is successful or not.

Figures 13, 14, 15:
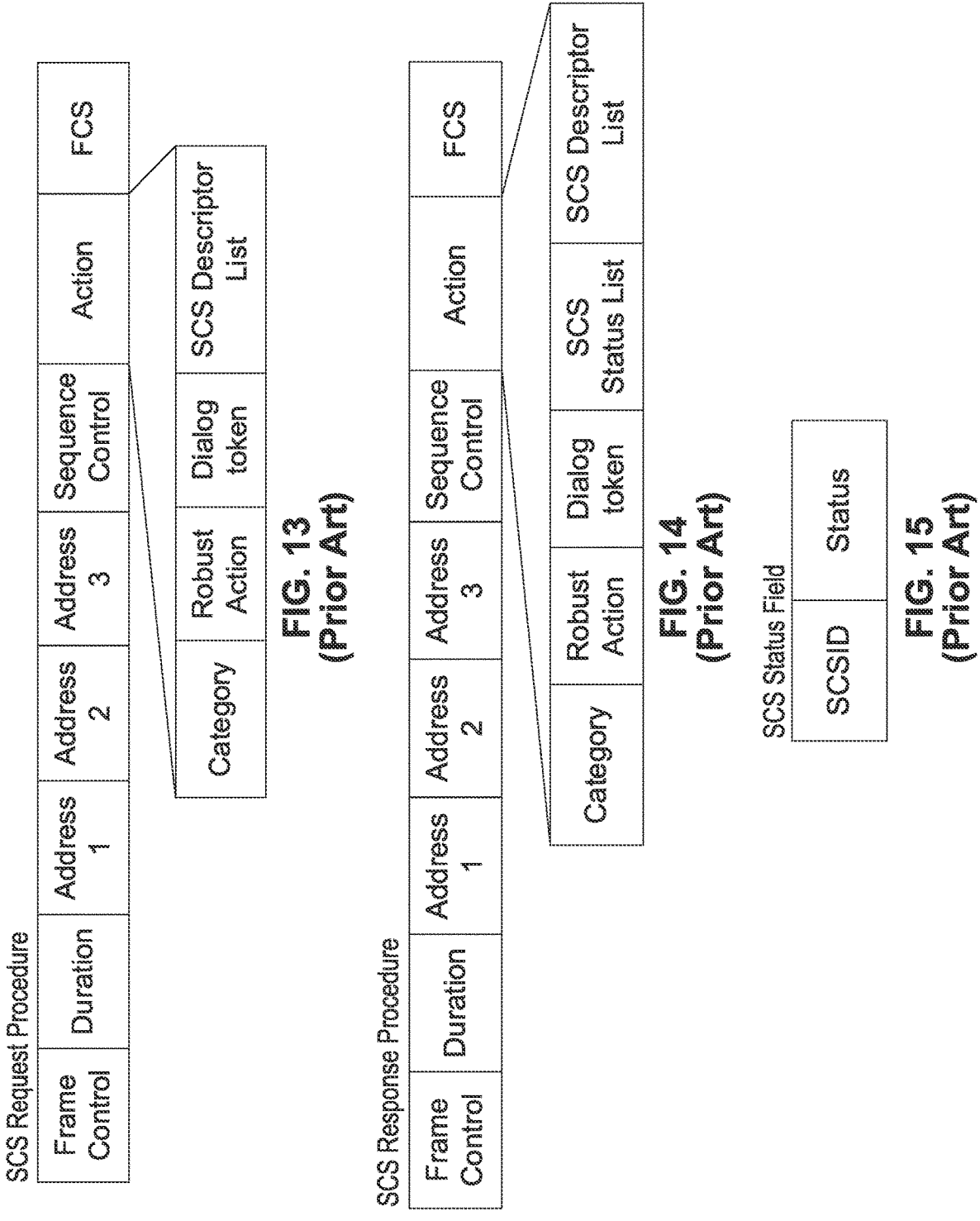
FIG. 13 is a data field diagram of a SCS request frame.
FIG. 14 is a data field diagram of a SCS response frame.
FIG. 15 is a data field diagram on the format of an SCS status field from the SCS response shown in FIG. 14.

FIG. 13 depicts the format of SCS request frame having fields of Frame Control, Duration, Address 1 through Address 3, Sequence Control, Action, and FCS. The Action field is shown with the following subfields: Category, Robust Action Dialogue Token, and SCS Descriptor List.

The SCS descriptor list field can carry multiple SCS descriptor elements as shown in FIG. 16, having subfields: Element ID, Length, SCSID, Request Type, Intra-Access Category Priority Element (optional), TCLAS Elements (optional), TCLAS Processing Element (optional), TSPEC Element (optional), and Optional Sub elements.

FIG. 14 depicts the format of a SCS response frame. The SCS status list field can carry multiple SCS status fields.

FIG. 15 depicts the format of an SCS status field as shown in FIG. 14. In each SCS status field, the status subfield represents the SCS setup result (e.g., accept, reject, reject with reasons, terminate, and so on.) of the SCS indicated in the SCSID field.

FIG. 16 depicts an SCS descriptor element having the following fields: Element ID, Length, SCSID, Request Type, Intra-Access Category Priority Element (optional), zero or more Traffic Classification (TCLAS) elements, TCLAS processing element(s), an optional Traffic Specification (TSPEC) element, and optional sub elements. It should be noted that the TSPEC element is replaced by a QoS Characteristics element in IEEE 802.11be.

2. Problem Statement

When the receiver STA maintains a receive reordering buffer for a HT-immediate block Ack agreement of an TA/TID, the traffic of the TA/TID contains the latency sensitive traffic and regular traffic. Then, the sequence number of MSDU or A-MSDU of the same TA/TID is not assigned in order of increasing expiration time of MSDU or A-MSDU. For example, the MSDU or A-MSDU of the latency sensitive traffic with an earlier expiration time is assigned a larger sequence number than the MSDU or A-MSDU of the regular traffic or the MSDU or A-MSDU of the latency sensitive traffic with later expiration time. It should be noted that the MSDU or A-MSDU of the regular traffic may not have an expiration time. This can occur when the MSDU or A-MSDU of latency sensitive traffic arrives at the MAC layer of the transmitter STA after the MSDU or A-MSDU of regular traffic or the MSDU or A-MSDU of the latency sensitive traffic with later expiration time has been transmitted but the communication failed.

For a MSDU or A-MSDU of latency sensitive traffic with expiration time that is received and stored at the receive reordering buffer by the receiver STA, the MSDU or A-MSDU of latency sensitive traffic has to be passed to the next MAC process before its expiration time. However, the MSDU or A-MSDU of latency sensitive traffic cannot be passed to the next MAC process if it is not the first MSDU or A-MSDU in the receive reordering buffer, or if the sequence number of the MSDU or A-MSDU is not equal to the WinStartB parameter of the receive reordering buffer. That is, if the MSDU or A-MSDU of latency sensitive traffic cannot be the first MSDU or A-MSDU in the receive reordering buffer before its expiration time, then the MSDU or A-MSDU of latency sensitive traffic cannot be passed to the next MAC process and the data in the MSDU or A-MSDU of latency sensitive traffic becomes invalid.

3. Contribution of the Present Disclosure

By utilizing the teachings of the present disclosure, the transmitter STA negotiates or indicates the expiration time of the MSDUs or A-MSDUs it transmits to the receiver STA.

By utilizing the described wireless protocol elements, the receiver STA shall pass a MSDU or A-MSDU with expiration time in the receive reordering buffer to the next MAC process before the expiration time of the MSDU or A-MSDU even if the MSDU or A-MSDU is not the first MSDU or A-MSDU in the receive reordering buffer. Accordingly, the present disclosure provides a mechanism which can increase the percentage of latency sensitive traffic packets being communicated prior to expiration.

4. Hardware and Network Topology

4.1. Communication Station (STA and MLD) Hardware

Figure 17:
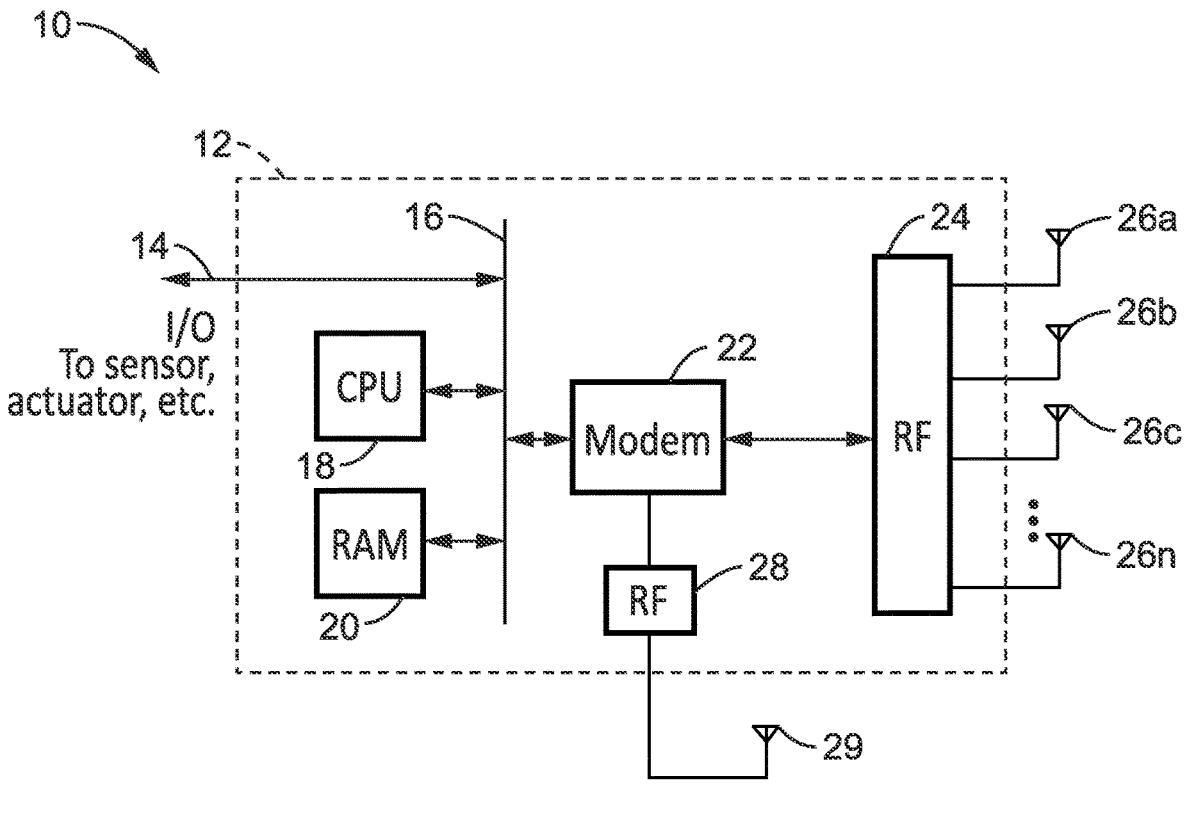
FIG. 17 is a block diagram of communication station hardware, according to at least one embodiment of the present disclosure.

FIG. 17 illustrates an example embodiment 10 of STA hardware configured for executing the protocol of the present disclosure. An external I/O connection 14 preferably couples to an internal bus 16 of circuitry 12 upon which are connected a CPU 18 and memory (e.g., RAM) 20 for executing a program(s) which implements the described communication protocol. The host machine accommodates at least one modem 22 to support communications coupled to at least one RF module 24, 28 each connected to one or multiple antennas 29, 26a, 26b, 26c through 26n. An RF module with multiple antennas (e.g., antenna array) allows for performing beamforming during transmission and reception. In this way, the STA can transmit signals using multiple sets of beam patterns.

Bus 14 allows connecting various devices to the CPU, such as to sensors, actuators and so forth. Instructions from memory 20 are executed on processor 18 to execute a program which implements the communications protocol, which is executed to allow the STA to perform the functions of an access point (AP) station or a regular station (non-AP STA). It should also be appreciated that the programming is configured to operate in different modes (TXOP holder, TXOP share participant, source, intermediate, destination, first AP, other AP, stations associated with the first AP, stations associated with the other AP, coordinator, coordinatee, AP in an OBSS, STA in an OBSS, and so forth), depending on what role it is performing in the current communication context.

Thus, the STA HW is shown configured with at least one modem, and associated RF circuitry for providing communication on at least one band. It should be appreciated that the present disclosure can be configured with multiple modems 22, with each modem coupled to an arbitrary number of RF circuits. In general, using a larger number of RF circuits will result in broader coverage of the antenna beam direction. It should be appreciated that the number of RF circuits and number of antennas being utilized is determined by hardware constraints of a specific device. A portion of the RF circuitry and antennas may be disabled when the STA determines it is unnecessary to communicate with neighboring STAs. In at least one embodiment, the RF circuitry includes frequency converter, array antenna controller, and so forth, and is connected to multiple antennas which are controlled to perform beamforming for transmission and reception. In this way the STA can transmit signals using multiple sets of beam patterns, each beam pattern direction being considered as an antenna sector.

In addition, it will be noted that multiple instances of the station hardware, such as shown in this figure, can be combined into a multi-link device (MLD), which typically will have a processor and memory for coordinating activity, although it should be appreciated that these resources may be shared as there is not always a need for a separate CPU and memory for each STA within the MLD.

Figure 18:
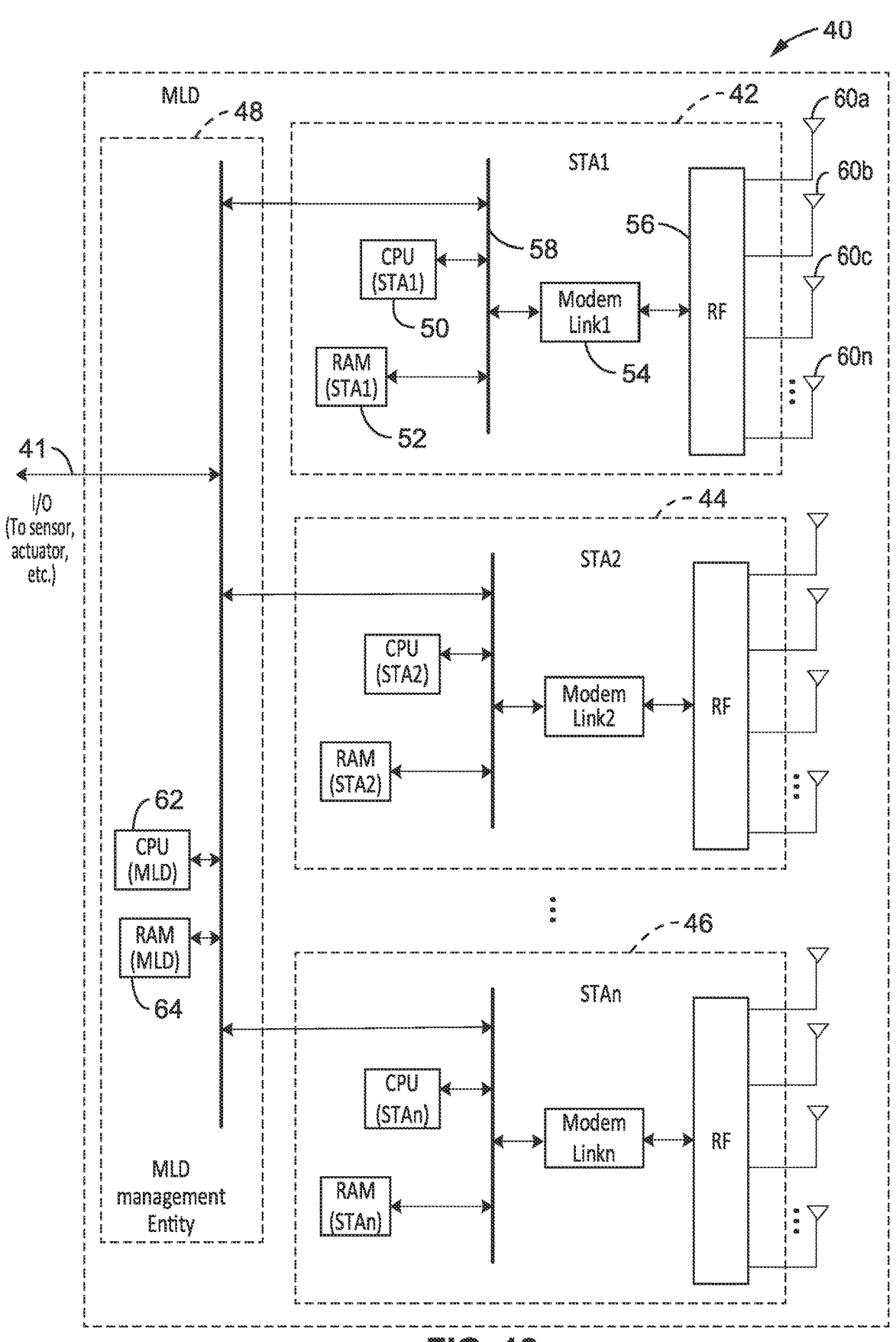
FIG. 18 is a block diagram of Multi-Link Device (MLD) hardware according to at least one embodiment of the present disclosure.

FIG. 18 illustrates an example embodiment 40 of a Multi-Link Device (MLD) hardware configuration. It should be noted that a "Soft AP MLD" is a MLD that consists of one or more affiliated STAs, which are operated as APs. A soft AP MLD should support multiple radio operations, for example on 2.4 GHz, 5 GHz and 6 GHz. Among multiple radios, basic link sets are the link pairs that satisfy simultaneous transmission and reception (STR) mode, e.g., basic link set (2.4 GHz and 5 GHz), basic link set (2.4 GHz and 6 GHz).

The conditional link is a link that forms a non-simultaneous transmission and reception (NSTR) link pair with some basic link(s). For example, these link pairs may comprise a 6 GHz link as the conditional link corresponding to 5 GHz link when 5 GHz is a basic link; 5 GHz link is the conditional link corresponding to 6 GHz link when 6 GHz is a basic link. The soft AP is used in different scenarios including Wi-Fi hotspots and tethering.

Multiple STAs are affiliated with an MLD, with each STA operating on a link of a different frequency. The MLD has external I/O access to applications, this access connects to a MLD management entity 48 having a CPU 62 and memory (e.g., RAM) 64 to allow executing a program(s) that implements communication protocols at the MLD level. The MLD can distribute tasks to, and collect information from, each affiliated station to which it is connected, exemplified here as STA 1 42, STA 2 44 through to STA N 46 and the sharing of information between affiliated STAs.

In at least one embodiment, each STA of the MLD has its own CPU 50 and memory (RAM) 52, which are coupled through a bus 58 to at least one modem 54 which is connected to at least one RF circuit 56 which has one or more antennas. In the present example the RF circuit has multiple antennas 60a, 60b, 60c through 60n, such as in an antenna array. The modem in combination with the RF circuit and associated antenna(s) transmits/receives data frames with neighboring STAs. In at least one implementation the RF module includes frequency converter, array antenna controller, and other circuits for interfacing with its antennas.

It should be appreciated that each STA of the MLD does not necessarily require its own processor and memory, as the STAs may share resources with one another and/or with the MLD management entity, depending on the specific MLD implementation. It should be appreciated that the above MLD diagram is given by way of example and not limitation, whereas the present disclosure can operate with a wide range of MLD implementations.

4.2. STA Topology Example

Figure 19:
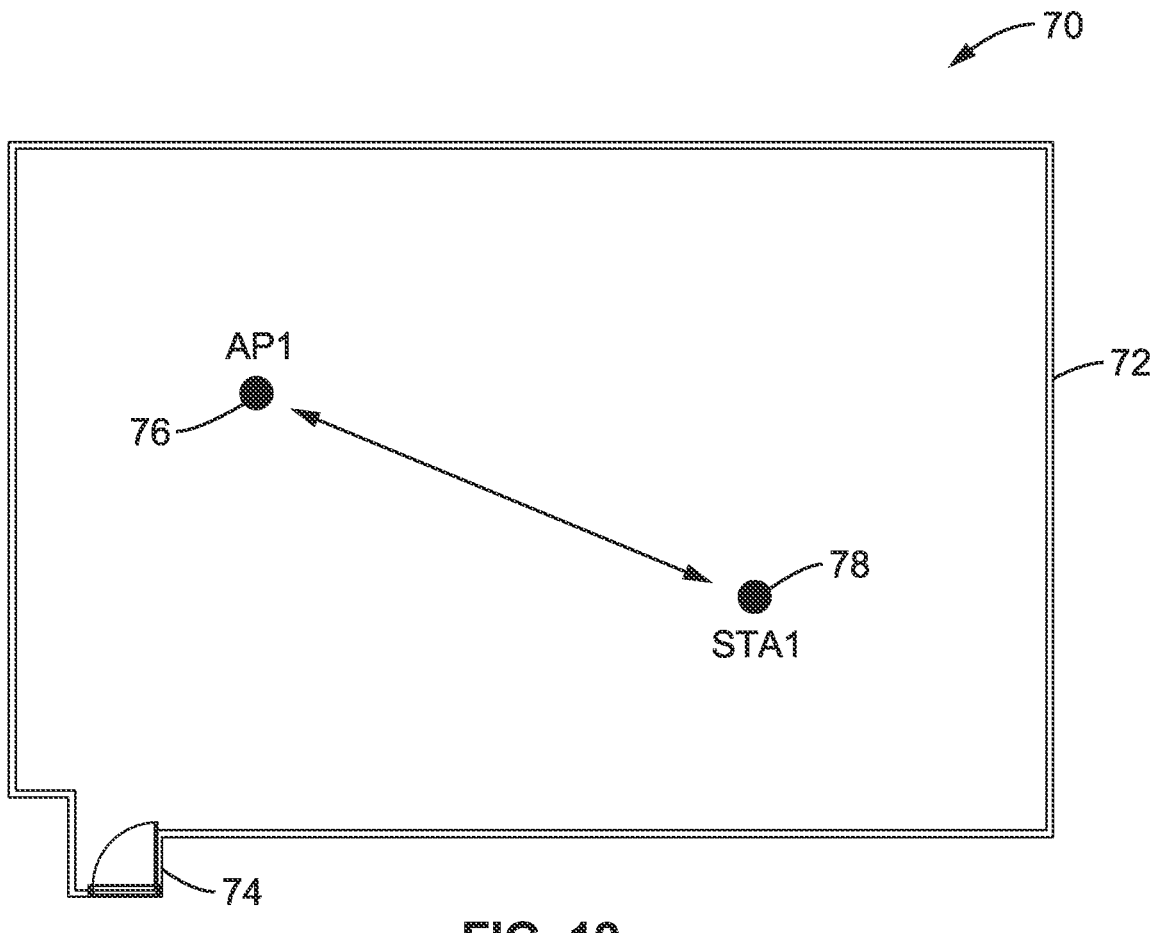
FIG. 19 is a network topology used in examples according to at least one embodiment of the present disclosure.

FIG. 19 illustrates an example STA topology 70 for consideration in the examples of the present disclosure. The figure is provided to aid in the discussions of the techniques involved towards engendering an improved understanding of the proposed technology. It should be appreciated that the present disclosure is in no way limited to the topology of this example, as the protocol may be utilized on communications between WLAN STAs and MLDs of any desired topology.

A Multi-Link Device (MLD) is a device that has more than one affiliated STA and has one Medium Access Control (MAC) Service Access Point (SAP) to Logical Link Control (LLC), which includes one MAC data service. An MLD is an AP MLD if APs are affiliated with that MLD. An MLD is a non-AP MLD if non-AP STAs are affiliated with that MLD.

As shown in the figure the scenario is exemplified as having multiple stations, shown here exemplified with two STAs within range of one another, such as in an enclosed area such as a meeting room 72 which may have one or more apertures 74 (e.g., doors and/or windows). One of these STAs is an Access Point (AP) as AP1 76 and the other is a non-AP STA as STA1 78 which associates with AP1. All STAs use Carrier-Sense Multiple Access/Collision Avoidance (CSMA/CA) for random channel access. It certain cases STA1 and/or AP1 can be associated with separate MLDs.

5. Receive Reordering Buffer Control for Latency Sensitive Traffic

The current receive reordering buffer control (per TA/TID) passes the MSDUs or A-MSDUs (of the same TA/TID) to the next MAC process in order of increasing sequence number of the MSDUs or A-MSDUs. Therefore, the current receive reordering buffer control does not pass the MSDU or A-MSDU to the next MAC process if the receive reordering buffer is waiting for another MSDU or A-MSDU with a smaller sequence number. This can cause the MSDU or A-MSDU of latency sensitive traffic getting stuck in the receive reordering buffer and missing its expiration time if it is not the MSDU or A-MSDU with the smallest sequence number that is expected to be received in the receive reordering buffer.

The MSDU or A-MSDU with the smallest sequence number that is expected to be received in the receive reordering buffer is denoted as the first MSDU or A-MSDU in the receive reordering buffer.

The proposed technologies propose to add additional rules in receive reordering buffer control for latency sensitive traffic so that the MSDU or A-MSDU of latency sensitive traffic can be passed to the next MAC process before the expiration time of the latency sensitive traffic.

For the first step, the STA needs to determine (know) the expiration time of each MSDU or A-MSDU in its receive reordering buffer control for latency sensitive traffic.

(a) The expiration time may consist of a pre-determined duration (or lifetime) that the MSDU or A-MSDU can be stored at the receive reordering buffer. It can be the time since the MSDU or A-MSDU arrives at the MAC layer of the receiver STA or since the MSDU or A-MSDU had arrived at the receive reordering buffer of the receiver STA. The expiration time can be determined by prior negotiation between the transmitter STA and receiver STA.

(b) The expiration time can be indicated in the MAC header of the MPDU which carries the MSDU or A-MSDU of the latency sensitive traffic. In at least one embodiment/mode/option, the expiration time can be set to an absolute time (for example TSF time), or a relative time (for example a lifetime expressed in specific time units (e.g., seconds, milli-seconds, micro-seconds, and so forth).

(c) The MSDU or A-MSDU of regular traffic can also have an expiration time as the MSDU or A-MSDU of the latency sensitive traffic. It is possible that the MSDU or A-MSDU of regular traffic in the receive reordering buffer can also be passed to the next MAC process if it is not the MSDU or A-MSDU with the smallest sequence number that is expected to be received in the receive reordering buffer.

For the second step, the STA shall ensure each MSDU or A-MSDU of the latency sensitive traffic in its receive reordering buffer is passed to the next MAC process before its expiration time.

(a) The MSDU or A-MSDU of the latency sensitive traffic is passed to the next MAC process immediately if it is the first MSDU or A-MSDU in the receive reordering buffer; which is the same as per the current rule in IEEE 802.11.

(b) The MSDU or A-MSDU of the latency sensitive traffic is passed to the next MAC process at its expiration time even if it is not the first MSDU or A-MSDU in the receive reordering buffer. Alternatively, the MSDU or A-MSDU of the latency sensitive traffic can be passed to the next MAC process at a time which is a period of time before its expiration time if it is not the first MSDU or A-MSDU in the receive reordering buffer.

It should be noted that in the present disclosure, the first MPDU or A-MPDU in the receive reordering buffer can be replaced by the MSDU or A-MSDU whose sequence number is equal to the WinStartB parameter of the receive reordering buffer. In some instances the sequence number of the first MSDU or A-MSDU in the receive reordering buffer is greater than the WinStartB parameter of the receive reordering buffer since there is a delay of updating the WinStartB parameter according to the first MSDU or A-MSDU in the receive reordering buffer.

It should be noted that the MPDUs in the same A-MSDU may require having the same, or a similar, expiration time; whereby the expiration time of A-MSDU may be set to the earliest expiration time of the MPDUs in the AOMSDU.

Figure 20:
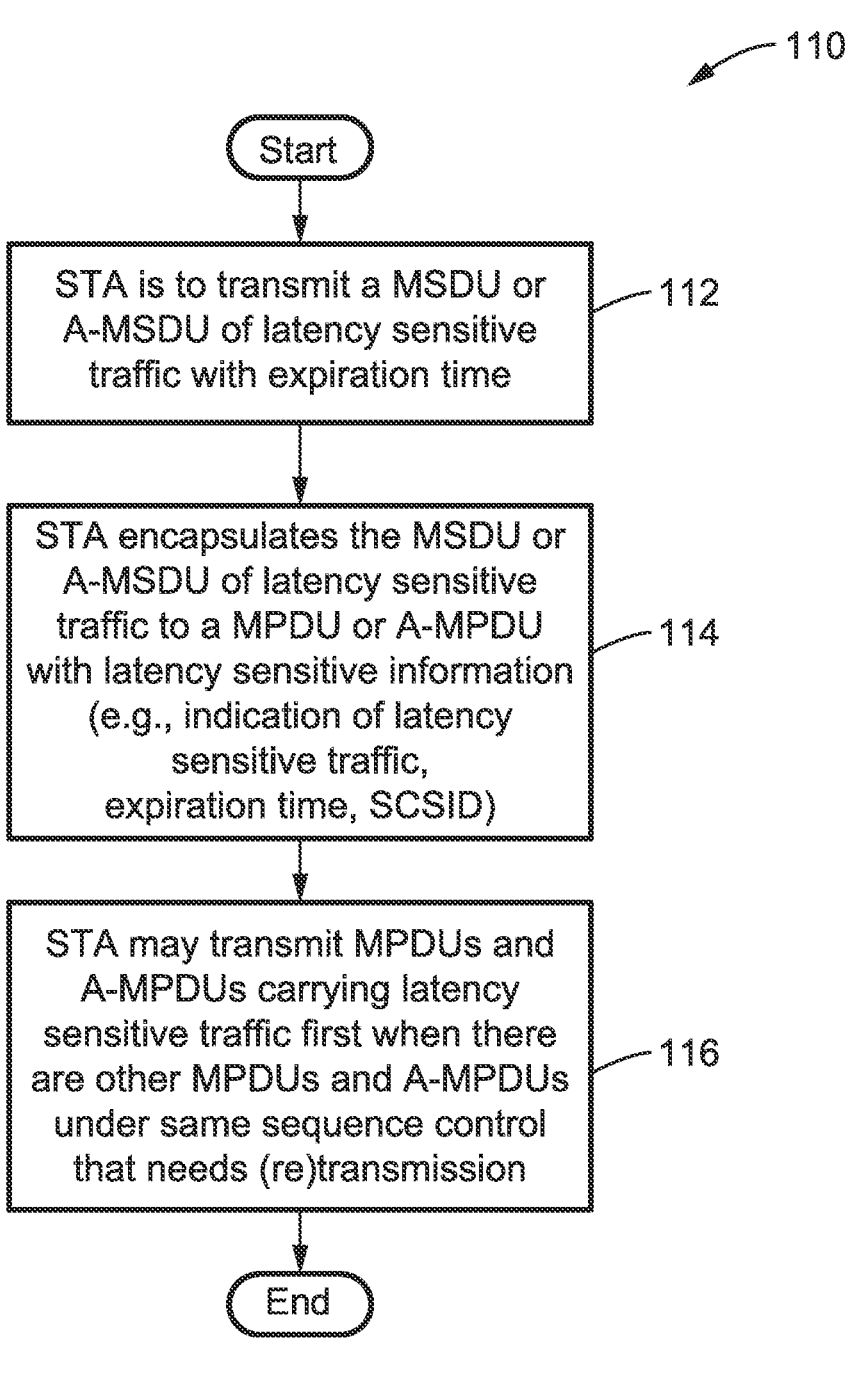
FIG. 20 is a flow diagram of a STA transmitting MSDU or A-MSDU with latency sensitive information, according to at least one embodiment of the present disclosure.

6. Flow Diagrams 6.1. Transmitting MSDU/A-MSDU with Latency Sensitive Information FIG. 20 illustrates an example embodiment 110 of a transmitter STA transmitting MSDU or A-MSDU with latency sensitive information. In block 112 the transmitting STA is to transmit an MSDU or A-MSDU with latency sensitive information that includes an expiration time. Then, in block 114 this transmitting STA encapsulates the MSDU or A-MSDU of the latency sensitive traffic to a MPDU with latency sensitive information, such as an indication of latency sensitive traffic, expiration time, and SCSID (if applicable). In at least one embodiment, the latency sensitive information can be carried by the MAC header of the MPDU, of other communication structure.

Figure 21:
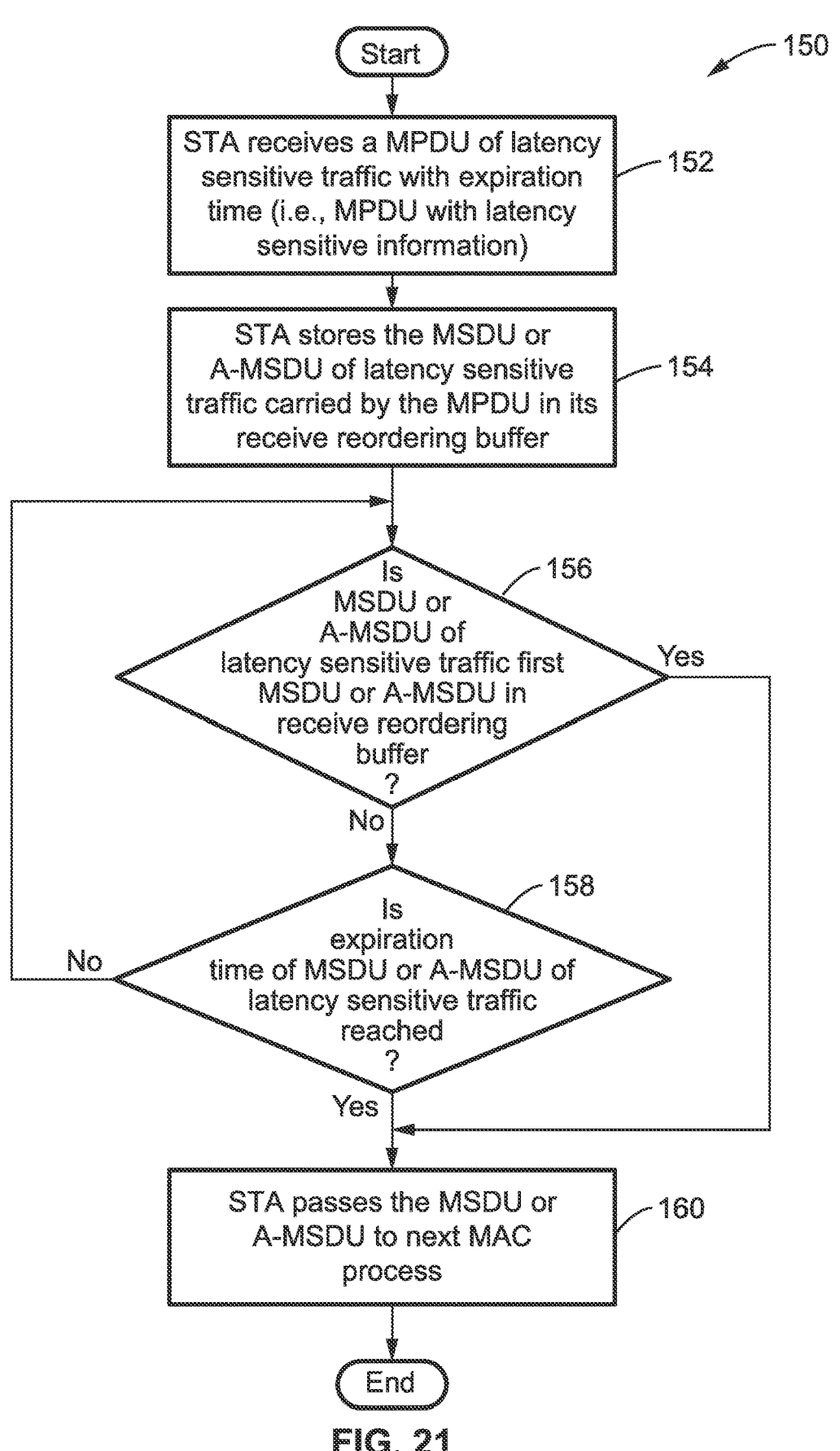
FIG. 21 is a flow diagram of a receiver STA passing MSDU or A-MSDU of latency sensitive traffic to the next MAC process in its receive reordering buffer, according to at least one embodiment of the present disclosure.
Figure 22:
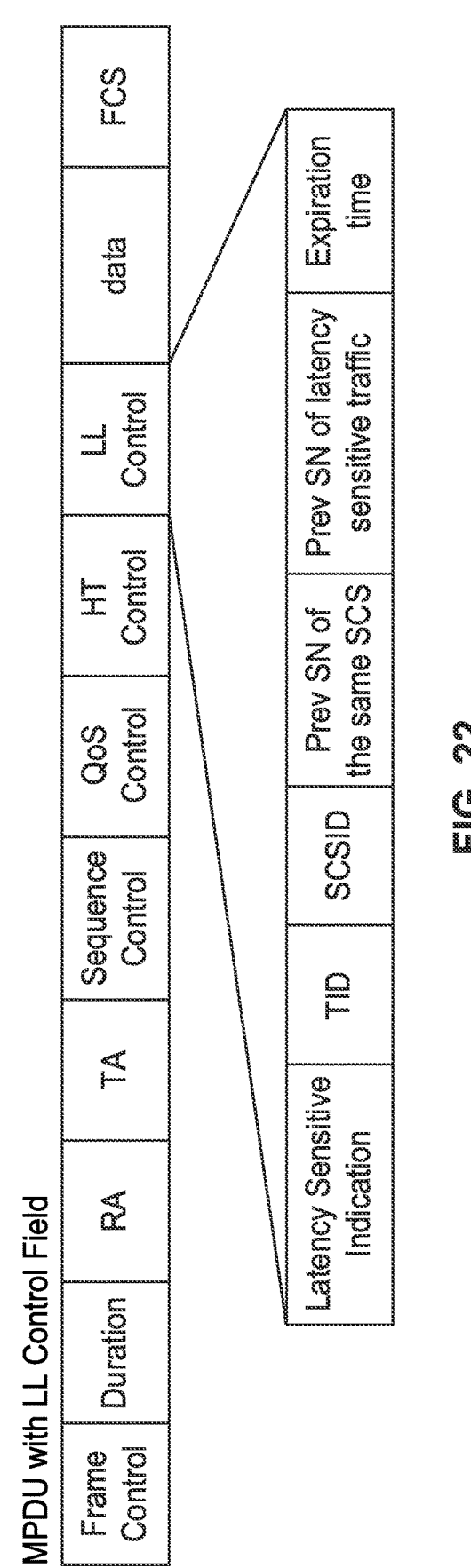
FIG. 22 is a data field diagram of a MPDU frame with LL control field, according to at least one embodiment of the present disclosure.

One example is shown in FIG. 22, whereby the latency sensitive information is carried by a new field, denoted as an LL control field, in the MAC header. Alternatively, the latency sensitive information as shown in FIG. 21 can also be carried by an HT control field or QoS control field in the MAC header.

It at least one embodiment/mode/option a value can be set in the frame type field in the frame control field of the MAC header to indicate that the MPDU is carrying latency sensitive traffic.

Next, in block 116 the STA may transmit or retransmit the MPDUs and A-MPDUs carrying latency sensitive traffic first when there are other MPDUs and A-MPDUs under the same sequence control (or same BA agreement) that require transmission or retransmission. It should be noted that the other MPDUs and A-MPDUs may have smaller sequence numbers than the MPDUs and A-MPDUs carrying the latency sensitive traffic.

For example, the STA may transmit the MPDUs and A-MPDUs carrying latency sensitive traffic first when there are other MPDUs and A-MPDUs under the same sequence control that requires retransmission. It should be noted that the other MPDUs and A-MPDUs may have smaller sequence numbers than the MPDUs and A-MPDUs carrying latency sensitive traffic.

If there is a MPDU or A-MPDU carrying latency sensitive traffic with a smaller sequence number that requires retransmission, then in at least one embodiment/mode/option the STA may have to retransmit that MPDU or A-MPDU first.

In at least one embodiment/mode/option the STA has to transmit MPDUs and A-MPDUS carrying latency sensitive traffic under the same sequence control in order for obtaining an increasing sequence number subfield value.

6.2. Rx Passing MSDU/A-MSDU in Rx Reordering Buffer

This section discusses the receiver STA passing MSDU or A-MSDU of latency sensitive traffic in its receive reordering buffer to the next MAC process.

FIG. 21 illustrates an example embodiment 150 of a receiver STA passing MSDU or A-MSDU of latency sensitive traffic to the next MAC process in its receive reordering buffer.

12

The receiver STA receives 152 a MPDU or A-MPDU of latency sensitive traffic with expiration time. The expiration time can be indicated in the MAC header of the MPDU as explained in FIG. 20. In at least one embodiment/mode/option the expiration time is pre-determined by prior negotiation, such as SCS negotiation using TSPEC element with MSDU expiration time/lifetime as shown in FIG. 29.

The receiver STA then stores 154 the MSDU or A-MSDU of latency sensitive traffic carried by the MPDU or A-MPDU in its receive reordering buffer (of the corresponding TA/TID).

At check 156 it is determined if the MSDU or A-MSDU of the latency sensitive traffic is the first MSDU or A-MSDU in the receive reordering buffer. If the condition is not met, check 158 is performed in which the STA checks if the expiration time of the MSDU or A-MSDU of the latency sensitive traffic is reached (or about to be reached). If this condition is not met, then execution returns to check 156.

Otherwise, if the condition of check 156 or 158 is met, then at block 160 the receiver STA passes the MSDU or A-MSDU to the next MAC process immediately.

It should be noted that if the conditions are not met in checks 156 and 158 that the STA retains the MSDU or A-MSDU of the latency sensitive traffic in its receive reordering buffer until it becomes the first MSDU or A-MSDU in the receive reordering buffer or the expiration time of the MSDU or A-MSDU of the latency sensitive traffic is reached, as it continues through these checks.

It should be noted that if the first MSDU or A-MSDU in the receiver reordering buffer consists of latency sensitive traffic and it is not received before its expiration time, then the WinStartB should be (at least) incremented by 1.

7. Frame Formats 7.1. MPDU with LL Control Field

FIG. 22 illustrates an example embodiment 180 of a MPDU (frame) with LL control field, having the following fields.

A Frame Control field indicates the type of frame, which can be used to indicate the MPDU is for latency sensitive traffic. For example, the type and subtype fields in the Frame control field can be set to a value which represents the MPDU is for latency sensitive traffic and/or indicates the presence of the LL control field. A Duration field contains NAV information used for CSMA/CA channel access. A Receive Address (RA) field contains an address for the recipient of the frame. A Transmitter Address (TA) field contains the address of the STA that transmitted the frame. A Sequence control field contains the fragment number and the sequence number of the frame. A QoS Control field and a HT Control field can utilize those fields as defined in IEEE 802.11.

An LL control field carries the latency sensitive information of the MSDU or A-MSDU of latency sensitive traffic that is carried in the data field, and has the following subfields.

A Latency Sensitive Indication subfield is set to indicate the MSDU or A-MSDU carried in the data field is latency sensitive traffic or regular traffic which is not considered latency sensitive. In at least on embodiment, this subfield can be implemented using a one bit indication. When this field is set to a first state (e.g., "1"), then this indicates that the data field carries latency sensitive traffic. Conversely, when this field is set to a second state (e.g., "0"), then the data field carries regular traffic.

A TID subfield is set to indicate the TID of the MSDU or A-MSDU carried in the data field. The receiver STA should store the MSDU or A-MSDU in the data field in its receive reordering buffer of the TA/TID whereby the TA is indicated in the TA field and the TID is indicated in the TID field. It should be noted that the TID field could also be indicated in a QoS control field.

A SCSID subfield is set to represent the SCS which the MSDU or A-MSDU carried in the data field it belongs to. It is possible that the receiver STA recognizes latency sensitive information, such as expiration time and TID, of the MSDU or A-MSDU according to the QoS characteristics, parameters and requirements of corresponding SCS.

A Previous SN of the same SCS subfield is set by the transmitter STA to the sequence number of the previous MSDU or A-MSDU of the same SCS traffic stream as indicated in the SCSID field that is transmitted by the transmitter STA. If the sequence number of the previous MSDU or A-MSDU of the same SCS traffic stream is smaller than the sequence number of the first MSDU or A-MSDU (or the WinStartB parameter) in the receive reordering buffer of the receiver STA or the corresponding previous MSDU or A-MSDU of the same SCS traffic stream has been received successfully and passed to the next MAC layer, then the receiver STA can pass the MSDU or A-MSDU carried by the MPDU to the next MAC process immediately (after it is stored at the receive reordering buffer).

When the receiver STA passes a MSDU or A-MSDU of the latency sensitive traffic which is not the first MSDU or A-MSDU in its receive reordering buffer to the next MAC process, then in at least one embodiment/mode/option the WinStartB parameter of the receive reordering buffer does not change or is set to the sequence number of the MSDU or A-MSDU of the latency sensitive traffic+1. It should be noted that this can be preconfigured by the network or negotiated between STAs. If MSDU or A-MSDU shows that the SN denoted in the Previous SN of the Same SCS field is expired, then the receiver STA may update the WinStartB parameter of the receive reordering buffer to the Previous SN of the same SCS field+1.

A Previous SN of Latency Sensitive Traffic subfield is set by the transmitter STA to the sequence number of the previous MSDU or A-MSDU of the latency sensitive traffic (e.g., the previous MSDU or A-MSDU whose Latency Sensitive Indication field is set to "1") of the same TID that is transmitted by the transmitter STA. If the sequence number of the previous MSDU or A-MSDU of the latency sensitive traffic is smaller than the sequence number of the first MSDU or A-MSDU (or the WinStartB parameter) in the receive reordering buffer of the receiver STA or the corresponding previous MSDU or A-MSDU of the same SCS traffic stream has been received successfully and passed to the next MAC layer, then the receiver STA can pass the MSDU or A-MSDU carried by the MPDU to the next MAC process immediately (after it is stored at the receive reordering buffer).

When the receiver STA passes a MSDU or A-MSDU of the latency sensitive traffic which is not the first MSDU or A-MSDU in its receive reordering buffer to the next MAC process, then in at least one embodiment/mode/option the WinStartB parameter of the receive reordering buffer does not change or is set to the sequence number of the MSDU or A-MSDU of the latency sensitive traffic+1. It should be noted that this can be preconfigured by the network or negotiated between STAs. If MSDU or A-MSDU with the SN equal to the previous SN of the latency sensitive traffic field is expired, the receiver STA may update the WinStartB parameter of the receive reordering buffer to the previous SN of the latency sensitive traffic field+1.

An Expiration time subfield is set by the transmitter STA to indicate the time that the MSDU or A-MSDU can be stored at the receive reordering buffer of the receiver STA. The receiver STA has to pass the MSDU or A-MSDU to the next MAC process before the expiration time is reached. The expiration time can be indicated in different ways, for example as an absolute time (such as TSF time, or an LSB of TSF time), or a relative time (such as time in a selected unit of time (e.g., seconds, milli-seconds, or micro-seconds). When the expiration time is set to relative time, it is the time since the MSDU or A-MSDU arrives at the receive reordering buffer (or the MAC layer) of the receiver STA.

It should be noted that the LL control field may only contain either Previous SN of the same SCS field or Previous SN of latency sensitive traffic field. In at least one embodiment/mode/option those two fields only contain the several LSB bits of the SN. In at least one embodiment/mode/option the LL control field can be a new variant of the HT control field or QoS control field.

8. Communication Examples

8.1. Example 1

Figure 23:
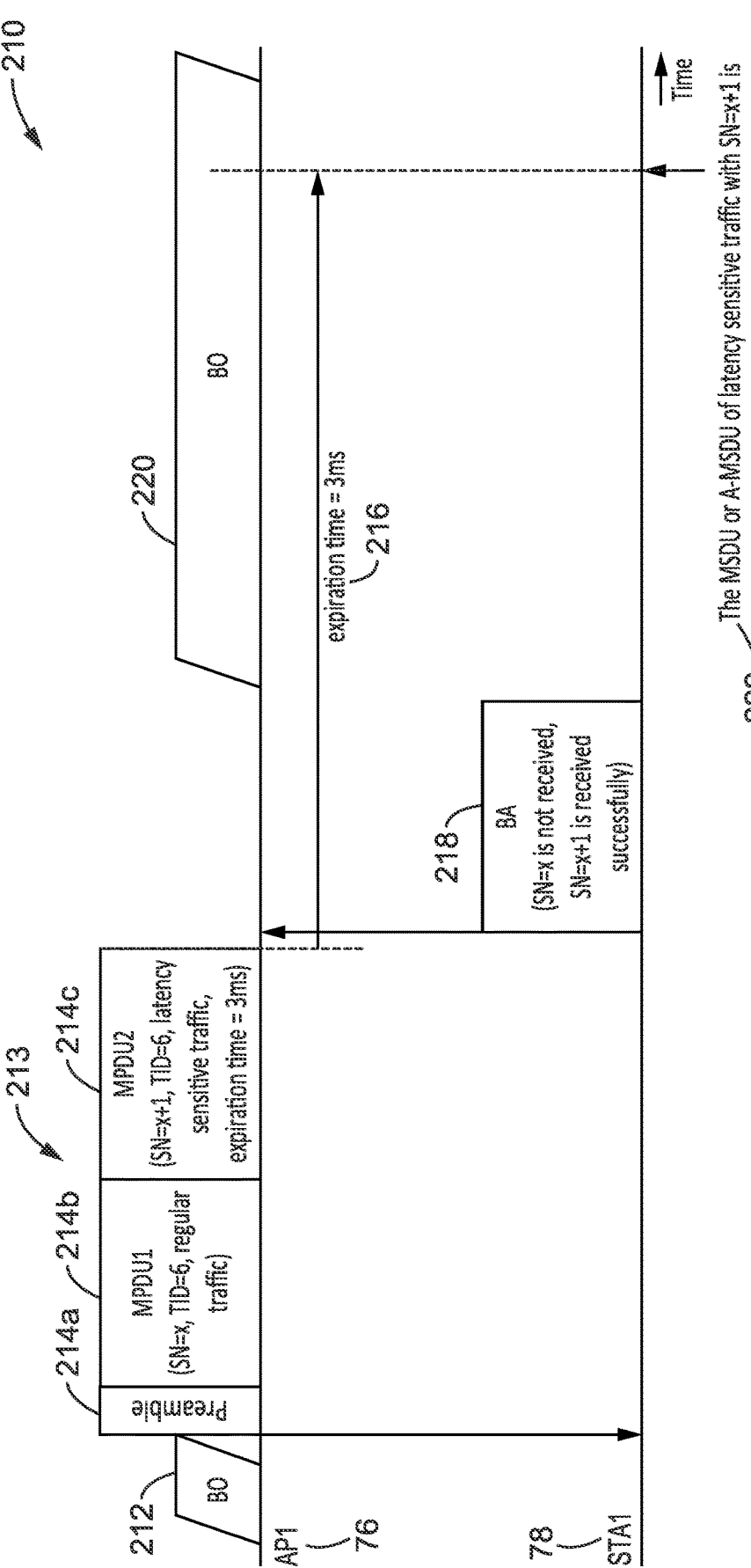
FIG. 23 is a communications diagram of a receiver STA passing a MSDU or A-MSDU of latency sensitive traffic which is not the first MSDU or A-MSDU in its receive reordering buffer, according to at least one embodiment of the present disclosure.

FIG. 23 illustrates an example embodiment 210 of a receiver STA passing a MSDU or A-MSDU of latency sensitive traffic which is not the first MSDU or A-MSDU in its receive reordering buffer. The network topology is that shown in FIG. 19. AP1 76 is the transmitter STA and STA1 78 is the receiver STA. In the figure is seen AP1 and STA1 establishing a BA agreement for TID=6.

After BO 212 AP1 obtains channel access and transmits a PPDU 213 (packet) with preamble 214a and carrying MPDU1 214b and MPDU2 214c. MPDU1 carries a MSDU (or A-MSDU) of regular traffic with sequence number=x. MPDU2 carries a MSDU (or A-MSDU) of latency sensitive traffic with sequence number=x+1. The expiration time of the MSDU of the latency sensitive traffic in this example is 3 ms which means that the receiver STA shall pass the MSDU of the latency sensitive traffic to the next MAC process in 3 ms since the MSDU of the latency sensitive traffic is received by the receiver STA and stored at its receive reordering buffer.

STA1 sends a BA 218 immediately after it receives the PPDU from AP1 to report that MPDU1 (i.e., MSDU with SN=x) has not been received but that MPDU2 (i.e., MSDU with SN=x+1) has been received successfully. STA1 stores the MSDU of the latency sensitive traffic with SN=x+1 at its receive reordering buffer of AP1/TID=6 but does not pass it to the next MAC process because the first MSDU in the receive reordering buffer of AP1/TID=6 is MSDU with SN=x.

AP1 then re-contends 220 for the channel (i.e., second backoff, denoted as BO, as shown in the figure) for the retransmission of MSDU with SN=x. However, before AP1 gains channel access for retransmission, the MSDU of the latency sensitive traffic with SN=x+1 expires 216 (i.e., the expiration time of the MSDU with SN=x+1 is reached). So although the MSDU with SN=x+1 is not the first MSDU or A-MSDU in the receive reordering buffer of AP1/TID=6, the receiver STA passes it 222 to the next MAC process.

In at least one embodiment/mode/option the expiration time of the MSDU or A-MSDU in MPDU2 can be set to a value of the TSF time (or LSB of TSF time) of AP1 or using other time units (e.g., seconds, milli-seconds, or micro-seconds), such as sending an integer value "x" for any of these selected units of time.

In at least one embodiment/mode/option after STA1 passes the MSDU or A-MSDU with SN=x+1 to the next MAC process, the MSDU with SN=x is still the first MSDU or A-MSDU in the receive reordering buffer of AP1/TID=6 at the receiver STA (an example of which is shown in FIG. 30). Alternatively, after STA1 passes the MSDU or A-MSDU with SN=x+1 to the next MAC process, the sequence number of the first MSDU or A-MSDU in the receive reordering buffer of AP1/TID=6 at the receiver STA should be set to x+2.

8.2. Example 6

Figure 24:
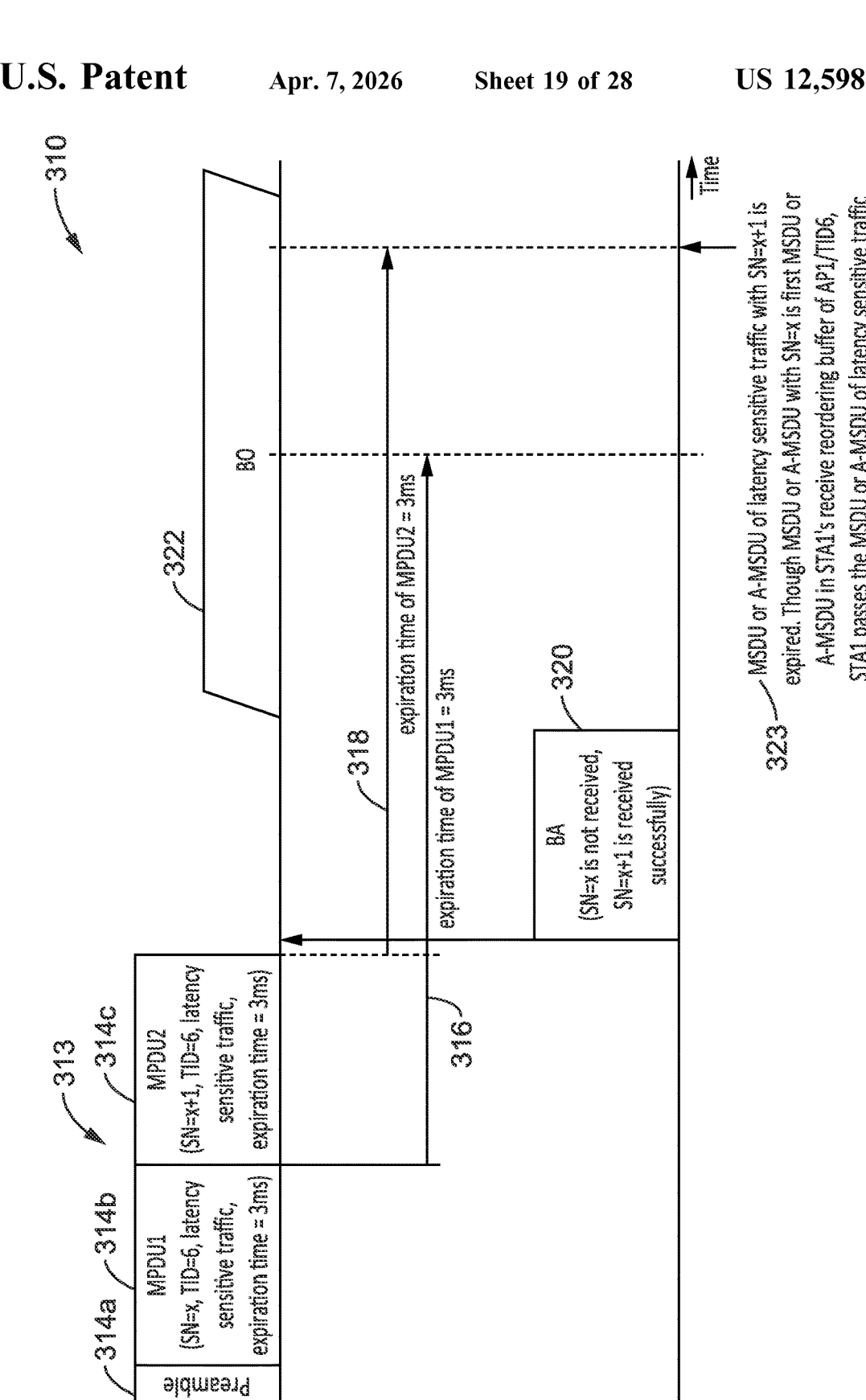
FIG. 24 is a communications diagram of another example of a receiver STA passing a MSDU or A-MSDU of the latency sensitive traffic which is not the first MSDU or A-MSDU in its receive reordering buffer, according to at least one embodiment of the present disclosure.

FIG. 24 illustrates another example embodiment 310 of the receiver STA passing a MSDU or A-MSDU of the latency sensitive traffic which is not the first MSDU or A-MSDU in its receive reordering buffer. It is possible that a TID can be either used for regular traffic or latency sensitive traffic. As shown in the figure, it is possible that TID=6 is for latency sensitive traffic only. The network topology is as shown in FIG. 19. AP1 76 is the transmitter STA and STA1 78 is the receiver STA. In the figure are seen AP1 and STA1 establishing a BA agreement for TID=6.

After backoff 212, AP1 obtains channel access and transmits a PPDU (packet) 313 with preamble 314a, carrying MPDU1 314b and MPDU2 314c. MPDU1 carries a MSDU (or A-MSDU) of latency sensitive traffic with sequence number=x. MPDU2 carries a MSDU (or A-MSDU) of latency sensitive traffic with sequence number=x+1. The expiration time of the MSDUs of the latency sensitive traffic in this example is set for 3 ms, seen as intervals 316 and 318, which means that the receiver STA shall pass the MSDU of the latency sensitive traffic to the next MAC process within 3 ms since the MSDU of the latency sensitive traffic is received by the receiver STA and stored at its receive reordering buffer. It should also be noted that the expiration time of the MSDUs of the latency sensitive traffic can be different, such as setting the expiration time of MPDU1=1 ms and the expiration time of MPDU2=2 ms.

STA1 sends a BA 320 immediately after it receives the PPDU from AP1 to report that MPDU1 (i.e., MSDU with SN=x) has not been received, but that MPDU2 (i.e., MSDU with SN=x+1) was received successfully. STA1 stores the MSDU of the latency sensitive traffic with SN=x+1 at its receive reordering buffer of AP1/TID=6 but does not pass it to the next MAC process because the first MSDU in the receive reordering buffer of AP1/TID=6 is MSDU with SN=x.

AP1 then re-contends (BO) 322 for the channel in this second backoff, for the retransmission of MSDU with SN=x. However, before AP1 gains channel access for retransmission, the MSDU of the latency sensitive traffic with SN=x+1 expires 318 (i.e., the expiration time of the MSDU with SN=x+1 is reached). Although the MSDU with SN=x+1 is not the first MSDU or A-MSDU in the receive reordering buffer of AP1/TID=6, the receiver STA passes it 323 to the next MAC process.

In at least one embodiment/mode/option the expiration time of the MSDU or A-MSDU in MPDU2 is set to a value of the TSF time (or LSB of TSF time) of AP1, or using other time units (e.g., seconds, milli-seconds, or micro-seconds), such as sending an integer value "x" for any of these selected units of time.

It is possible that after STA1 passes the MSDU or A-MSDU with SN=x+1 to the next MAC process, the MSDU with SN=x is still the first MSDU or A-MSDU in the receive reordering buffer of AP1/TID=6 at the receiver STA (an example is shown in FIG. 22). Alternatively, after STA1 passes the MSDU or A-MSDU with SN=x+1 to the next MAC process, the sequence number of the first MSDU or A-MSDU in the receive reordering buffer of AP1/TID=6 at the receiver STA should be set to x+2.

8.3. Example 2

Figure 25:
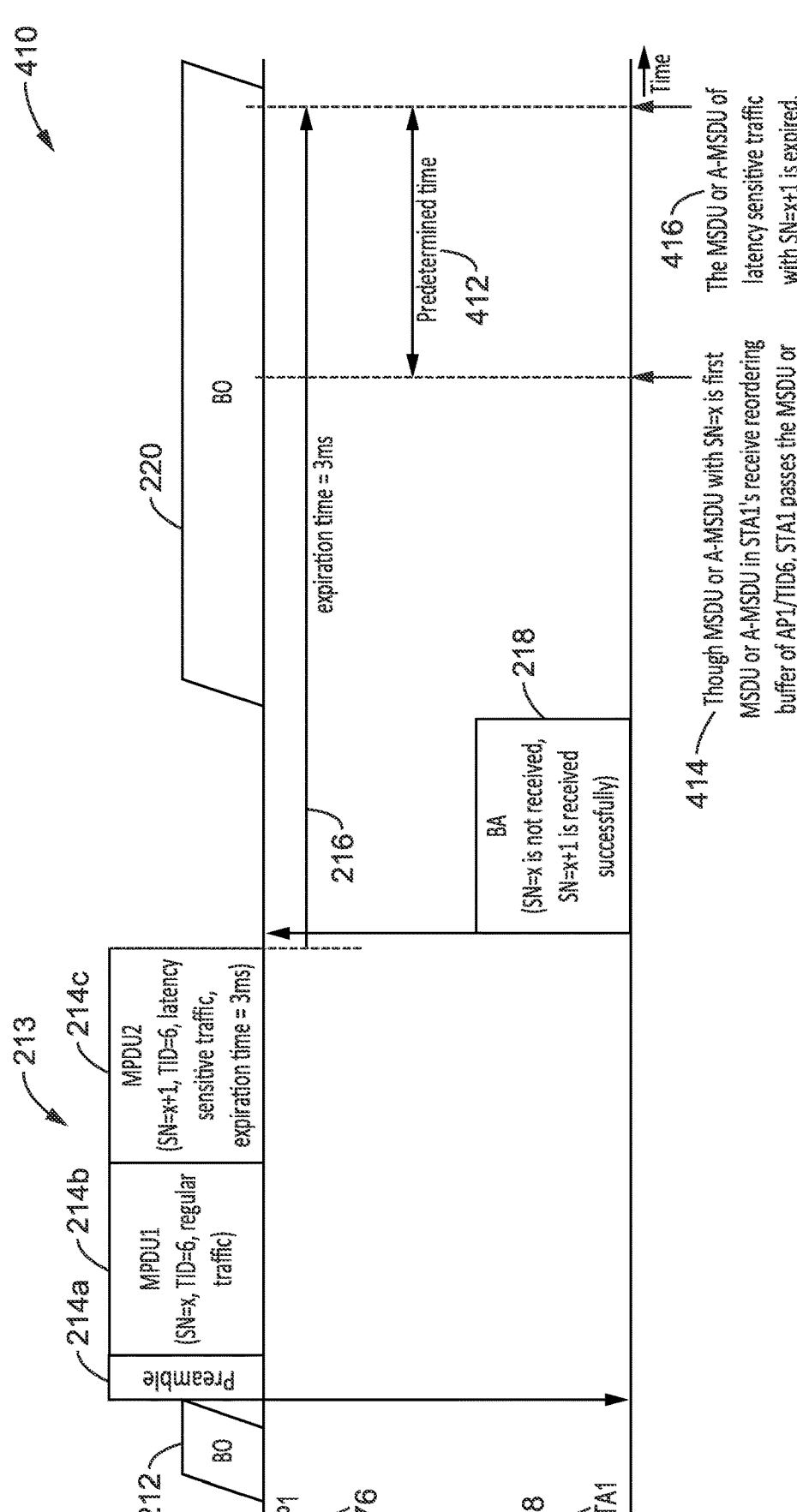
FIG. 25 is a communications diagram of a receiver STA passing a MSDU or A-MSDU of the latency sensitive traffic a certain period of time before its expiration time, according to at least one embodiment of the present disclosure.

FIG. 25 illustrates an example embodiment 410 of the receiver STA passing a MSDU or A-MSDU of the latency sensitive traffic a certain period of time before its expiration time. The network topology used is as shown and described in FIG. 19.

This example is similar to that of FIG. 23, except that this example shows that STA1 passes the MSDU of the latency sensitive traffic with SN=x+1 to the next MAC process a period of time 412 (i.e., the pre-determined time as shown in the figure) before the expiration time of the MSDU. The period of time can be pre-determined, or as determined by prior negotiation between AP1 and STA1.

Thus, although 414 the MSDU or A-MSDU with SN=x is the first MSDU or A-MSDU in the reordering buffer of STA1 of AP1/TID6, STA1 passes the MSDU or A-MSDU of latency sensitive traffic with SN=x+1 to the next MAC process at a predetermined time before the expiration time. And as noted 416, then at the end of predetermined time 412, the MSDU or A-MSDU of the latency sensitive traffic with SN=x+1 is expired.

8.4. Example 3

Figure 26:
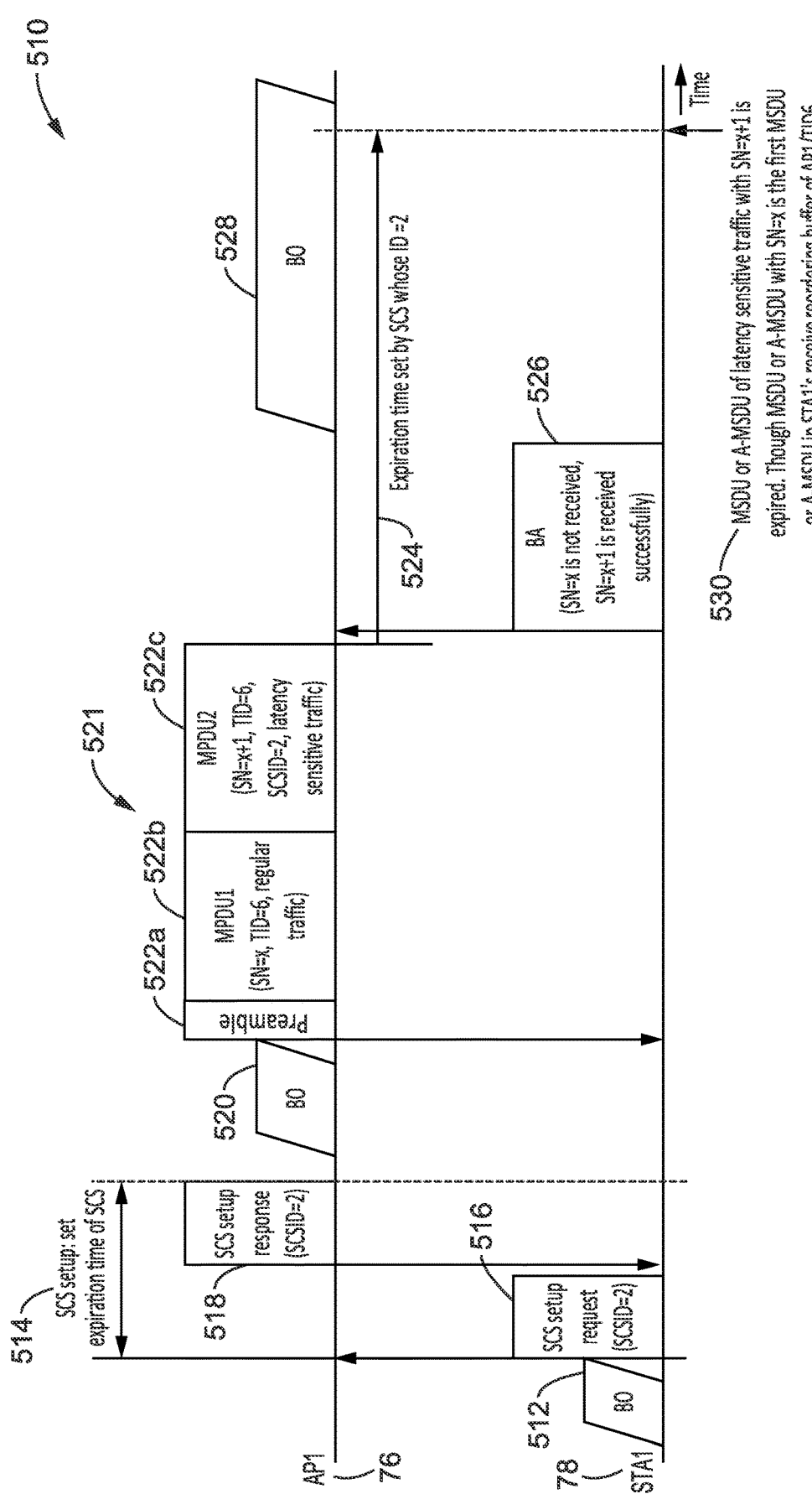
FIG. 26 is a communications diagram of a pre-determined expiration time of MSDUs of the latency sensitive traffic, according to at least one embodiment of the present disclosure.

FIG. 26 illustrates an example embodiment 510 an example of pre-determined expiration time of MSDUs of the latency sensitive traffic. The network topology is that described in FIG. 19.

AP1 76 is the transmitter STA and STA1 78 is the receiver STA. In this example AP1 and STA1 establish a BA agreement for TID=6.

As shown in the figure, STA1 and AP1, perform an SCS Setup process 514, by exchanging SCS setup request and response frames to establish a SCS with SCSID=2. This is depicted as STA1, after backoff (BO) 512 sending an SCS setup request 516, and AP1 responding with an SCS setup response 518. During the SCS setup procedure, STA1 and AP1 also determine the expiration time of the MSDUs and A-MSDUs of the SCS with SCSID=2. It should be noted that the expiration time field can be added to the TSPEC element or QoS characteristics element in the SCS setup request/response frame as shown in FIG. 29.

Then, similar to FIG. 23, after AP1 contends (BO) 520 and gains channel access, AP1 transmits a PPDU 521 with preamble 522a and carrying MPDU1 522b and MPDU2 522c. MPDU1 carries a MSDU (or A-MSDU) of regular traffic with sequence number=x. MPDU2 carries a MSDU (or A-MSDU) of latency sensitive traffic with sequence number=x+1, which is also latency sensitive traffic belonging to the SCS with SCSID=2. According to the SCS setup, the expiration time 524 of the MSDU with SN=x+1 is predetermined. The receiver STA shall pass the MSDU of the latency sensitive traffic to the next MAC process since the MSDU with SN=x+1 before the expiration time of SCS with SCSID=2 is reached.

STA1 sends a BA 526 immediately after it receives the PPDU from AP1 to report that MPDU1 (i.e., MSDU with SN=x) is not received but the MPDU2 (i.e., MSDU with SN=x+1) is received successfully. STA1 stores the MSDU of the latency sensitive traffic with SN=x+1 at its receive reordering buffer of AP1/TID=6, but does not pass it to the next MAC process because the first MSDU in the receive reordering buffer of AP1/TID=6 is MSDU with SN=x.

In at least one embodiment/mode/option the expiration time of the MSDU or A-MSDU in MPDU2 is set to a value based on TSF time (or LSB of TSF time) of AP1, or using other time units (e.g., seconds, milli-seconds, or micro-seconds), such as sending an integer value "x" for any of these selected units of time.

AP1 is seen contending again for the channel 528 during which time the expiration time occurs 524, wherein the MSDU or A-MSDU is passed 530 to the next MAC process. It is possible that after STA1 passes the MSDU or A-MSDU with SN=x+1 to the next MAC process, the MSDU with SN=x is still the first MSDU or A-MSDU in the receive reordering buffer of AP1/TID=6 at the receiver STA.

Alternatively, after STA1 passes the MSDU or A-MSDU with SN=x+1 to the next MAC process, the sequence number of the first MSDU or A-MSDU in the receive reordering buffer of AP1/TID=6 at the receiver STA should be set to x+2.

8.5. Example 5

Figure 27:
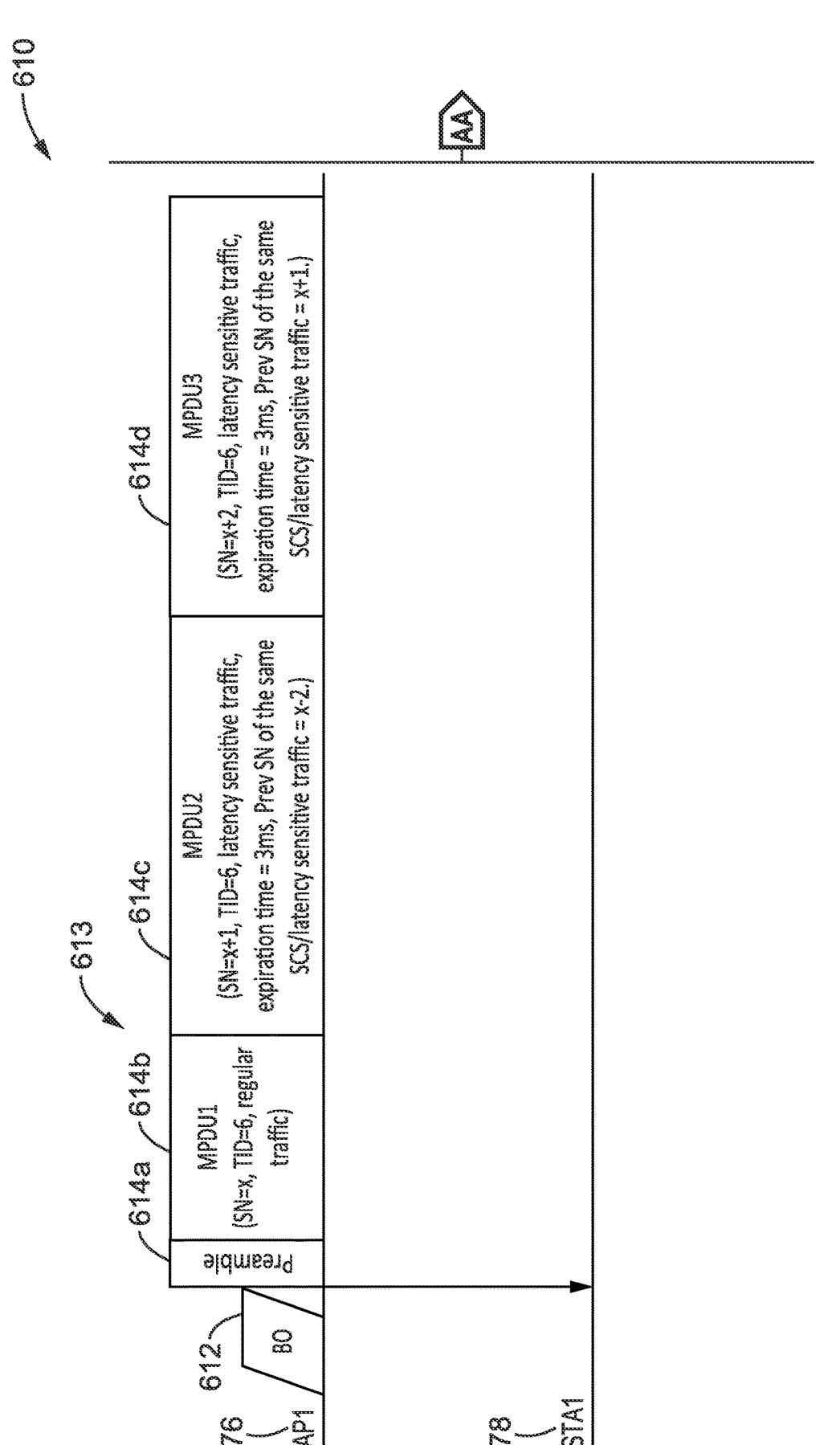
FIG. 27 and FIG. 28 is a communications diagram of a STA transmitting MSDU or A-MSDU carrying latency sensitive traffic with a large SN earlier than the MSDU or A-MSDU carrying regular traffic with a smaller SN, according to at least one embodiment of the present disclosure.
Figure 28:
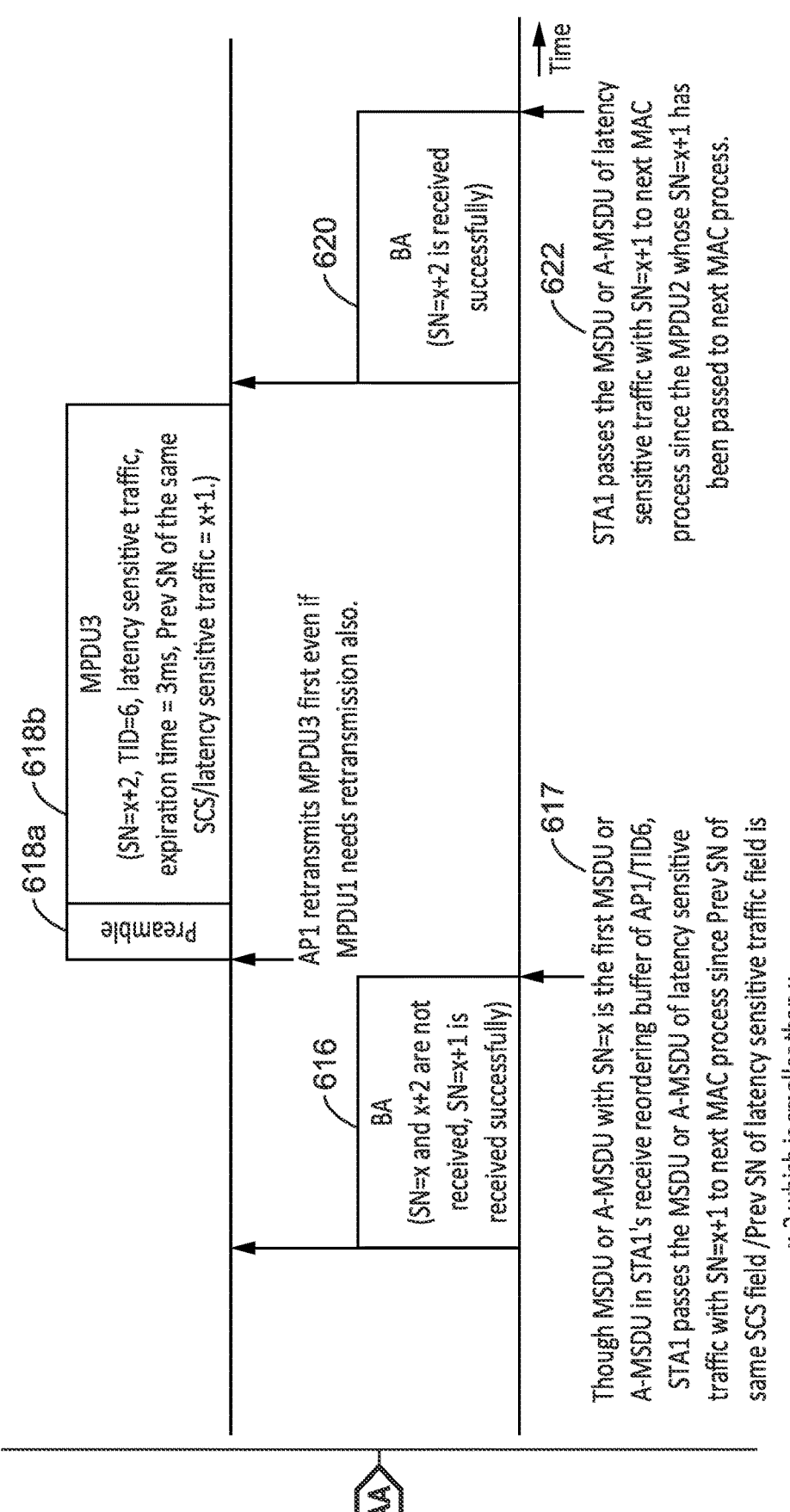

FIG. 27 and FIG. 28 illustrate an example embodiment 610 of the transmitter STA transmitting MSDU or A-MSDU carrying latency sensitive traffic with a large SN earlier than the MSDU or A-MSDU carrying regular traffic with a smaller SN. Also, this example shows that it is possible, that if the receiver STA receives MSDUs and A-MSDUs carrying latency sensitive traffic (or carrying latency sensitive traffic of a same SCS traffic stream) in order, the receiver STA passes the MSDU or A-MSDU of the latency sensitive traffic immediately after it is received. It should be noted that the received MSDU or A-MSDU of the latency sensitive traffic (or carrying latency sensitive traffic of a same SCS traffic stream, respectively) may not be the first MSDU or A-MSDU in the receive reordering buffer. The network topology is that shown in FIG. 19.

A MSDU or A-MSDU carrying latency sensitive traffic of a TID (or of a SCS traffic stream) is indicated to be received in order when the previous MSDU or A-MSDU carrying latency sensitive of the same TID (or of the same SCS traffic stream, respectively) has been received successfully and passed to the next MAC process or has SN smaller than the WinStartB (i.e., the previous MSDU or A-MSDU has either been received successfully by the receiver or dropped by the transmitter).

In FIG. 27 AP1 76 is the transmitter STA and STA1 78 is the receiver STA. AP1 and STA1 are shown establishing a BA agreement for TID=6. AP1 contends (BO) 612 for, and gains channel access and is seen transmitting a PPDU 613 with preamble 614a and carrying MPDU1 614b, MPDU2 614c and MPDU3 614d. MPDU1 carries a MSDU (or A-MSDU) of regular traffic with sequence number=x. MPDU2 and MPDU3 carry two MSDUs (or A-MSDUs) of latency sensitive traffic with sequence number=x+1 and x+2, respectively. The expiration time of the MSDU of the latency sensitive traffic is by way of example and not limitation exemplified as 3 ms which indicates that the receiver STA shall pass the MSDU of the latency sensitive traffic to the next MAC process in 3 ms since the MSDU of the latency sensitive traffic is received by the receiver STA and stored at its receive reordering buffer. MPDU2 indicates that the previous MSDU or A-MSDU of the latency sensitive traffic of TID6 (or the previous MSDU or A-MSDU of the latency sensitive traffic of the same SCS) has SN=x−2. MPDU3 indicates that the previous MSDU or A-MSDU of the latency sensitive traffic of TID6 (or the previous MSDU or A-MSDU of the latency sensitive traffic of the same SCS) is MPDU3.

Moving into FIG. 28, it is seen that STA1 sends a BA 616 immediately after it receives the PPDU from AP1 to report that MPDU1 (i.e., MSDU with SN=x) and MPDU3 (i.e., MSDU with SN=x+2) have not been received but that MPDU2 (i.e., MSDU with SN=x+1) was received successfully. STA1 stores the MSDU of the latency sensitive traffic with SN=x+1 at its receive reordering buffer of AP1/TID=6.

Although the SN of the first MSDU or A-MSDU in the receive reordering buffer of AP1/TID=6 at STA1 is x, STA1 passes 617 MSDU with SN=x+1 to the next MAC process immediately because the previous MSDU or A-MSDU of the latency sensitive traffic of TID6 (or the previous MSDU or A-MSDU of the latency sensitive traffic of the same SCS) has SN=x−2, which is smaller than the WinStartB. That is, MSDU with SN=x+1 is received in order. Therefore, STA1 passes the MSDU with SN=x+1 to the next MAC process immediately.

It should be noted that that even if MSDU with SN=x+1 is passed to the next MAC process, in at least one embodiment/mode/option that STA1 can retain WinStartB=x at the receive reordering buffer of AP1/TID=6. In at least one embodiment/mode/option STA1 may set WinStartB=x+2 instead.

Since MPDU3 carries latency sensitive traffic, but MPDU1 only carries regular traffic, AP1 decides to retransmit MPDU3 first, shown with preamble 618a and MPDU3 618b, and STA1 responds with a BA 620 which indicates that MPDU3 is received successfully. Since the previous MSDU or A-MSDU of the previous MSDU or A-MSDU carrying latency sensitive of the same TID (or of the same SCS traffic stream, respectively) has been received successfully and passed 622 to the next MAC process (i.e., MSDU with SN=x+1), MSDU with SN=x+2 is received in order. Therefore, STA1 passes the MSDU with SN=x+1 to the next MAC process immediately.

As shown in the figure, the second PPDU only carries MPDU3. It should be noted that in at least one embodiment/mode/option MPDU1 can be carried in the second PPDU and transmitted after MPDU3. That is, MPDU3 is the first MPDU, and MPDU1 is the second MPDU in the second PPDU.

As shown in the figure, the first PPDU carries MPDU1, MPDU2, and MPDU3. It is possible that MPDU2 and MPDU3 are the first and second MPDUs in the first PPDU and MPDU1 is the last MPDU. The order of the MPDUs of the same SCS traffic stream may still have to be in the order of increasing SN.

9. Additional Examples and Elements

9.1. TSpec Element with EHT Attributes

FIG. 29 illustrates an example embodiment 650 of a TSPEC element with an MSDU expiration time/lifetime field. As shown in the figure, it consists of two parts. The first part is the TSPEC field which can be identical to the TSPEC element as defined in IEEE 802.11. The second part is an EHT Attributes whose presence could be indicated by setting a reserved bit in the original TSPEC element to "1".

The MSDU expiration time/lifetime field is included in the EHT Attributes. The STA sets this field to specify the MSDU expiration time of the traffic under TSPEC. When the receiver STA receives the MSDU or A-MSDU under TSPEC and stores it in its receive reordering buffer, it then has to pass the MSDU or A-MSDU to the next MAC process before the MSDU expiration time (or a certain period of time before the MSDU expiration time). The MSDU expiration time could be either absolute time or relative time.

In using absolute time, such as TSF time, the time value represents the time before which the receiver STA of the MSDU or A-MSDU under the TSPEC has to pass the MSDU or A-MSDU under the TSPEC to the next MAC process.

In using relative time, such as lifetime (e.g., 3 ms), the time value represents the time that the receiver STA of the MSDU or A-MSDU under TSPEC can store the MSDU or A-MSDU under the TSPEC in its receive reordering buffer since it receives the MSDU or A-MSDU under TSPEC. After that time, the receiver STA of the MSDU or A-MSDU under the TSPEC has to pass the MSDU or A-MSDU under the TSPEC to the next MAC process.

The Replay Counter Needed subfield is also in the EHT Attributes. The STA sets this field to indicate whether a separate CCMP/GCMP replay counter needs to be maintained by the receiver STA of the traffic stream under the TSPEC. In at least one embodiment, this field can be a one bit indication, that when set to a first state (e.g., "1"), indicates that the receiver STA of the traffic stream under the TSPEC is to maintain a separate CCMP/GCMP replay counter for the traffic stream under the TSPEC. The traffic stream under the TSPEC will only use the CCMP/GCMP replay counter for the traffic stream under the TSPEC for replay detection. Otherwise, the receiver STA of the traffic stream under the TSPEC does not maintain a separate CCMP/GCMP replay counter for the traffic stream under the TSPEC. It should be noted that this field is reserved when the CCMP/GCMP is not used to protect the traffic stream under the TSPEC. It should be noted that the replay counter requested by the TSPEC element here should also be subject to the RSN Capabilities of the receiver of this traffic stream.

In at least one embodiment/mode/option the MSDU expiration time/lifetime field and the replay counter needed field are added to the QoS Characteristics element as defined in IEEE 802.11be [Draft P802.11be D1.3], and the QoS Characteristics element in which the two new fields can be used to replace the TSPEC element with EHT Attributes as shown in FIG. 29. It should also be noted that the TSPEC element with EHT Attributes may comprise a new element.

9.2. CCMP/GCMP for Latency Sensitive Traffic

When CCMP/GCMP (CCMP or GCMP) is used to protect the data of latency sensitive traffic, the transmitter STA assigns a Packet Number (PN) to each MPDU when encrypting the MPDU into CCMP/GCMP MPDU for transmitting. When the CCMP/GCMP MPDU is received by the receiver STA, it will perform replay detection based on the PN of the CCMP/GCMP MPDU. If the PN of the CCMP/GCMP MPDU is smaller than the current replay counter value for the CCMP/GCMP MPDU, then the CCMP/GCMP MPDU will be discarded.

When the receive reordering buffer control for latency sensitive traffic is used with CCMP/GCMP, the MPDU or A-MSDU of the latency sensitive traffic, which is not the first MPDU or A-MSDU in the receive reordering buffer, can be passed to the next MAC process, which could be CCMP/GCMP decapsulation and replay detection. If the first MSDU or A-MSDU in the receive reordering buffer and the MSDU or A-MSDU of the latency sensitive traffic use the same replay counter for the CCMP/GCMP replay detection, then the first MPDU or A-MSDU in the receive reordering buffer will be discarded by replay detection because the PN of the first MPDU or A-MSDU is smaller than the MSDU or A-MSDU of the latency sensitive traffic.

In order to avoid the MSDU or A-MSDU being discarded in the above case, the receiver STA in at least one embodiment/mode/option may maintain separate replay counters for latency sensitive traffic and regular traffic. For example, the receiver STA maintains a separate replay counter per TID of regular traffic, and a separate replay counter per TID of latency sensitive traffic. In at least one embodiment/mode/option the receiver STA maintains a separate replay counter for a SCS.

9.3. CCMP/GCMP MPDU with LL Control Field

FIG. 30 illustrates an example embodiment 870 of CCMP/GCMP MPDU (CCMP MPDU or GCMP MPDU) with LL control field. The MAC header can be identical to that in MPDU with LL control field as shown in FIG. 15.

If the MPDU is a CCMP MPDU, the MPDU contains a CCMP header which can be constructed and decoded as shown in FIG. 2 through FIG. 6.

If the MPDU is GCMP MPDU, the MPDU contains GCMP header which can be constructed and decoded as shown in FIG. 8 through FIG. 10.

The data of the CCMP MPDU can be encrypted and decrypted as shown in FIG. 2 through FIG. 6 or FIG. 31 whereby the SCSID affects the encryption and decryption procedure.

The data of the CCMP MPDU can be encrypted and decrypted as shown in FIG. 8 through FIG. 10 or FIG. 31 whereby the UP and SCSID can affect the encryption and decryption procedure. It should be noted that the Message Integrity Check (MIC) of the GCMP MPDU is encrypted and the MIC of the CCMP is not encrypted.

9.4. Example 4

Figure 31:
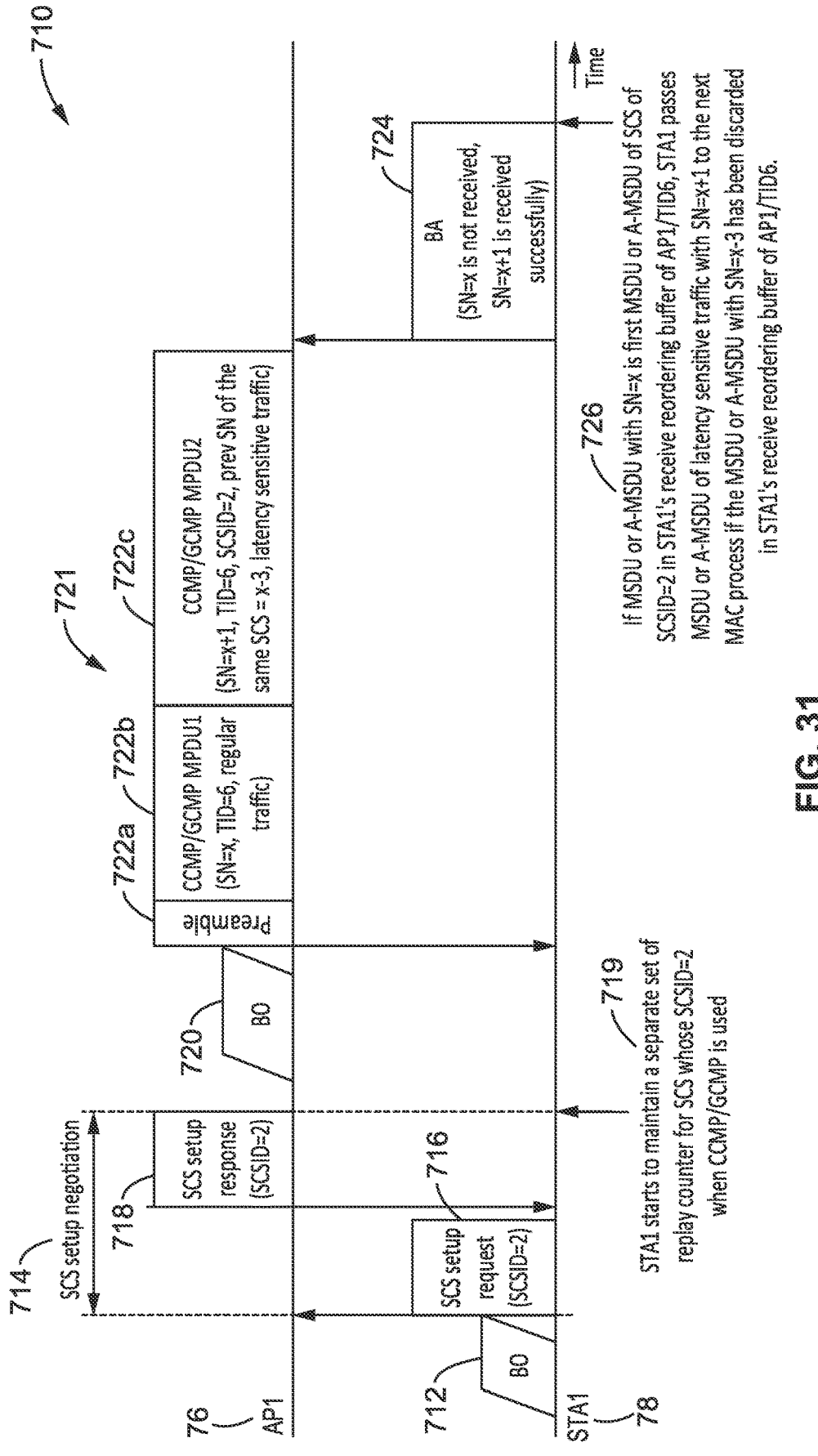
FIG. 31 is a communications diagram of a receiver STA maintaining a separate replay counter for SCS that is established with the transmitter STA, according to at least one embodiment of the present disclosure.

FIG. 31 illustrates an example embodiment 710 of the receiver STA maintaining a separate replay counter for SCS that is established with the transmitter STA. The network topology is the same as shown in FIG. 19.

AP1 76 is the transmitter STA and STA1 78 is the receiver STA. In this figure AP1 and STA1 establish a BA agreement for TID=6 and CCMP/GCMP is used to protect the transmission.

As shown in the figure, STA1 and AP1 perform an SCS setup negotiation 714, by exchanging SCS setup request and response frames to establish a DL SCS with SCSID=2. STA1 is shown contending for the channel with BO 712, and when it obtains the channel it sends an SCS setup request 716, to which AP1 responds with SCS response 718. During this SCS setup procedure, STA1 and AP1 also decide that STA1 starts to maintain a separate replay 719 counter for the SCS with SCSID=2. It should be noted that the TSPEC element in the SCS setup request/response frame can have an EHT attributes field as shown in FIG. 29.

Then, similar to FIG. 23, AP1 contends with BO 720 for the channel, and gains channel access. It transmits a PPDU 721 having preamble 722a and carrying CCMP/GCMP MPDU1 722*b* and CCMP/GCMP MPDU2 722*c*. CCMP/GCMP MPDU1 carries a MSDU (or A-MSDU) of regular traffic with SN=x and PN=y. CCMP/GCMP MPDU2 carries a MSDU (or A-MSDU) of latency sensitive traffic with SN=x+1 and PN=y+1, which is also latency sensitive traffic belonging to the SCS with SCSID=2.

STA1 immediately sends BA 724 after it receives the PPDU from AP1 to report that CCMP/GCMP MPDU1 (i.e., MSDU with SN=x) has not been received but that CCMP/GCMP MPDU2 (i.e., MSDU with SN=x+1) has been received successfully. STA1 stores the MSDU of the latency sensitive traffic with SN=x+1 in its receive reordering buffer of AP1/TID=6 and immediately passes it 726 to the next MAC process, for example CCMP/GCMP decryption and replay detection.

CCMP/GCMP then decrypts the CCMP/GCMP MPDU2 and performs replay detection. Since the replay counter for CCMP/GCMP MPDU2 (i.e., the replay counter for SCSID=2) is separate from that for TID=6 (i.e., the replay counter for TID=2), the CCMP/GCMP MPDU1 will not be discarded when it is received later and replay detection is performed using the replay counter for TID=2. Therefore, it is possible that STA1 does not update the parameters (e.g., WinStartB) of the receive reordering buffer of AP1/TID6 and continues waiting to receive CCMP/GCMP MPDU1 from AP1.

9.5. CCMP/GCMP encaps/decaps MPDU with LL Control Field

CCMP/GCMP encapsulation and decapsulation for CCMP/GCMP MPDU with LL control field.

Figure 32:
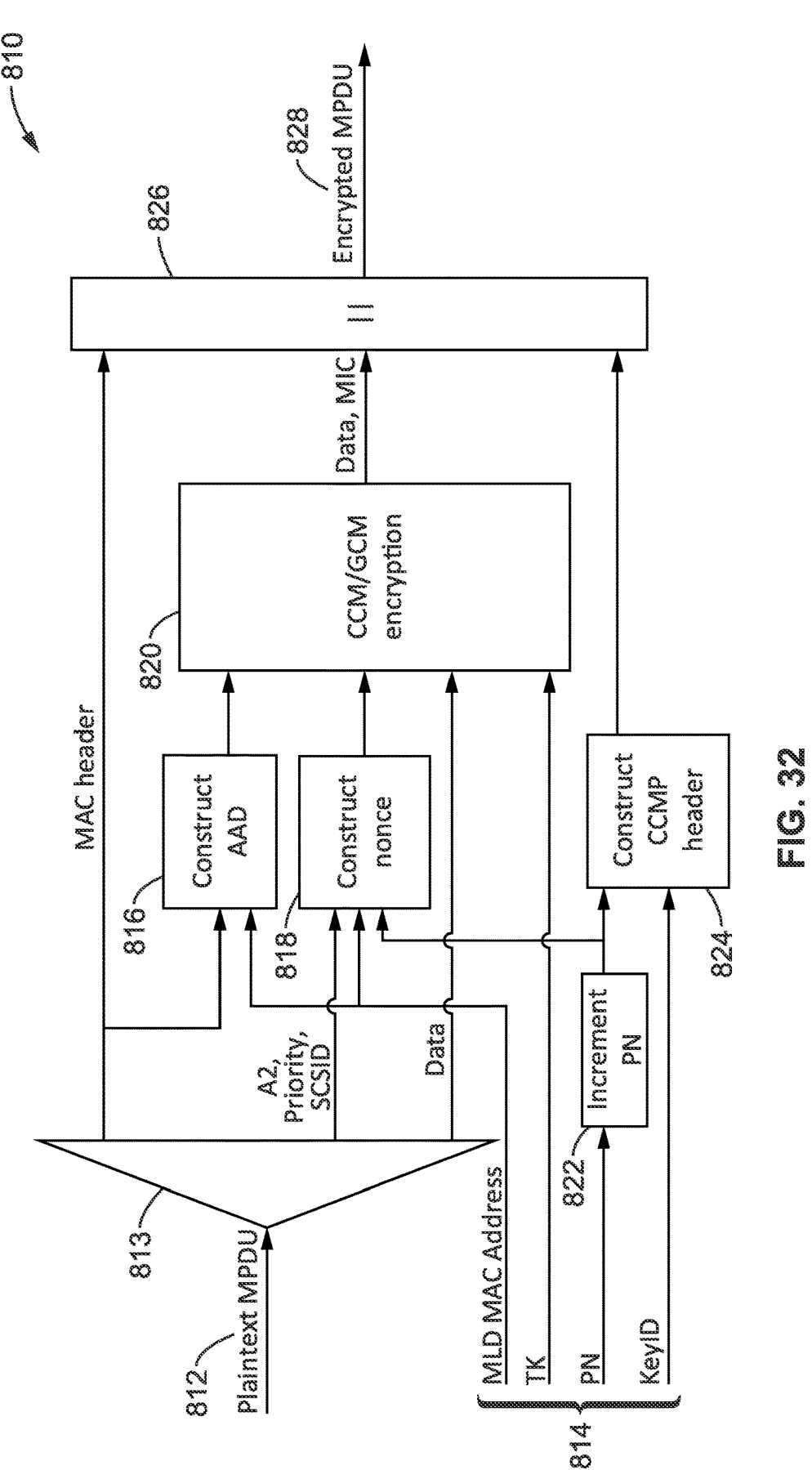
FIG. 32 is a block diagram of a a CCMP/GCMP encapsulation procedure for a CCMP/GCMP MPDU with an LL control field, according to at least one embodiment of the present disclosure.
Figure 33:
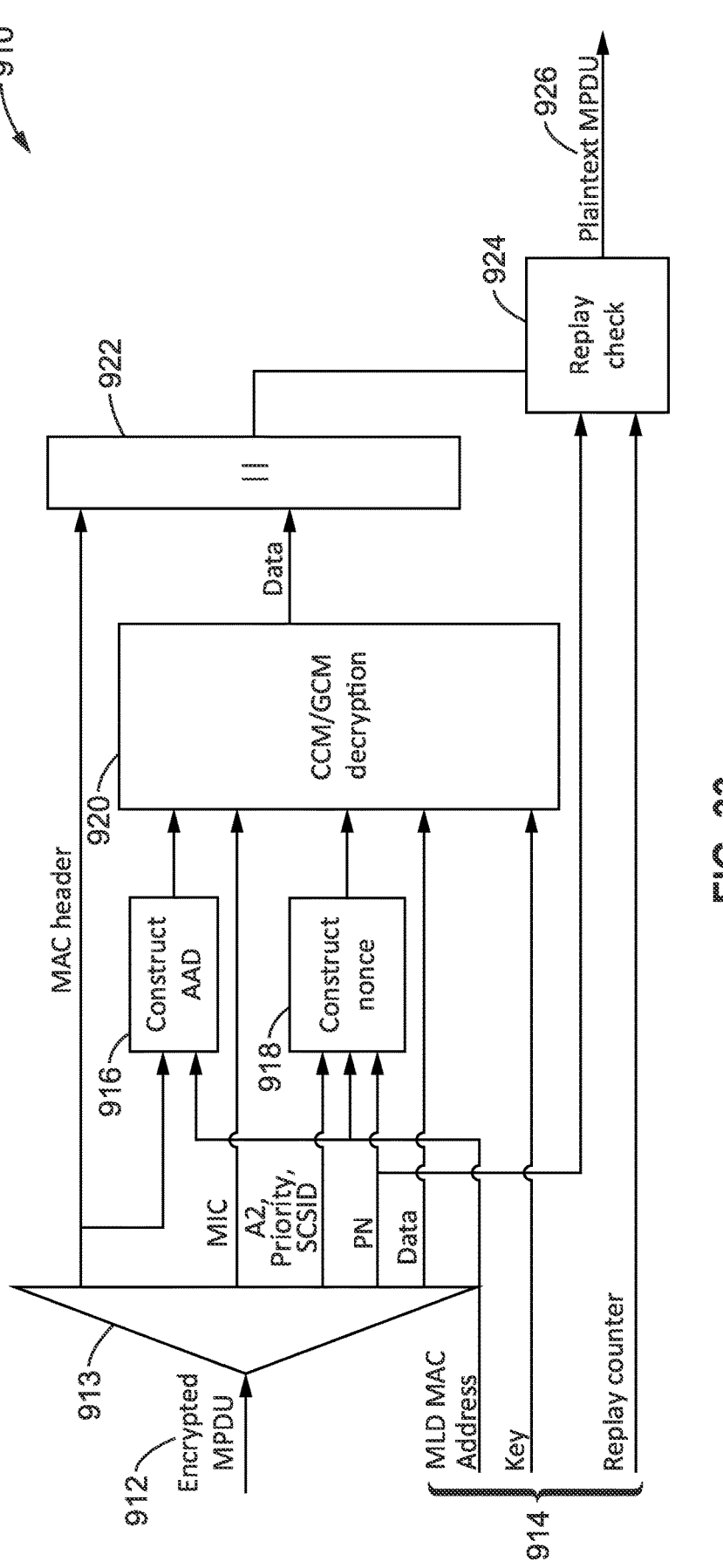
FIG. 33 is a block diagram of a a CCMP/GCMP decapsulation procedure for a CCMP/GCMP MPDU with an LL control field, according to at least one embodiment of the present disclosure.

FIG. 32 and FIG. 33 illustrates an example embodiment 810, 910 of a CCMP/GCMP encapsulation and decapsulation procedure for a CCMP/GCMP MPDU with an LL control field, respectively.

Figures 34, 35:
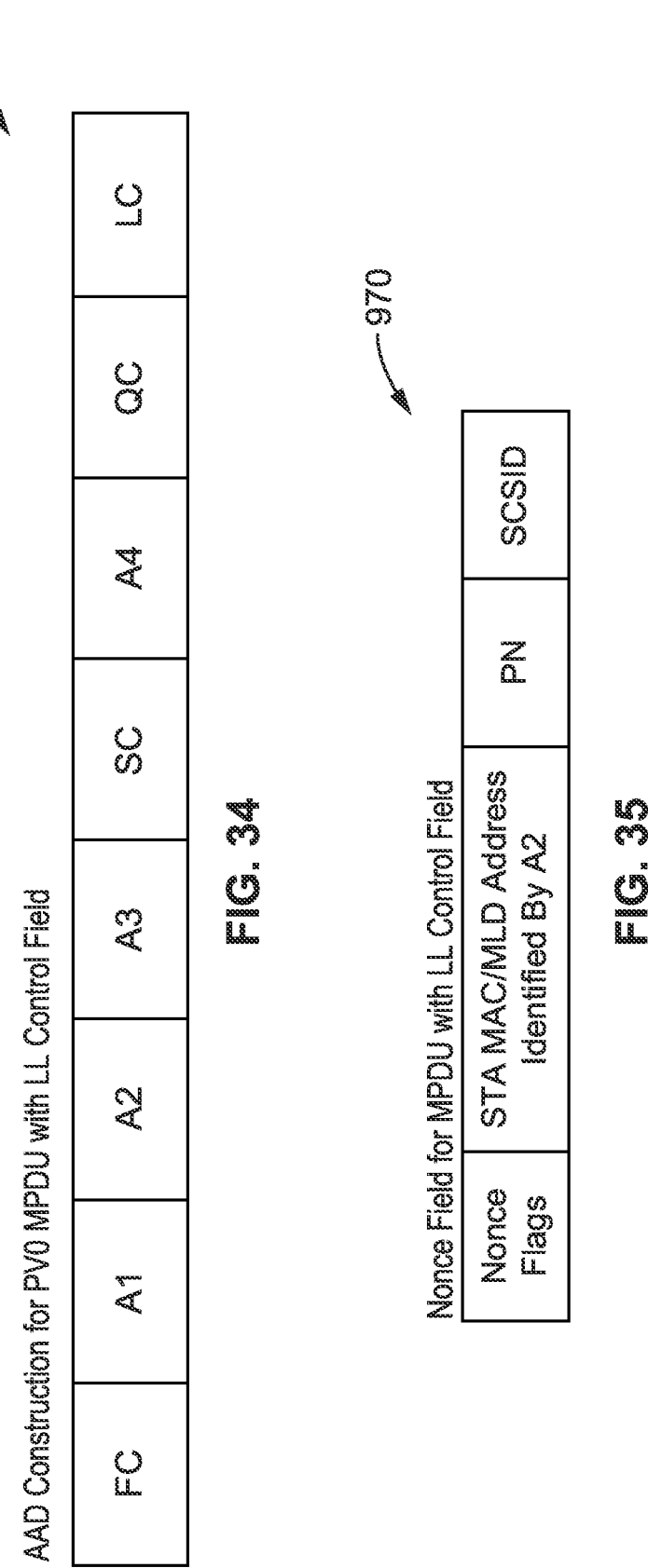
FIG. 34 is a data field diagram of an AAD Construction for PV0 MPDU with LL control field, according to at least one embodiment of the present disclosure.
FIG. 35 is a data field diagram of a Nonce field for MPDU with LL control field, according to at least one embodiment of the present disclosure.

Compared with the procedure shown in FIG. 2 through FIG. 6 and FIG. 30, the AAD construction may consider the LL control field (i.e., LC field in FIG. 34). The nonce construction can consider SCSID as shown in FIG. 35.

In FIG. 32 the encapsulation 810 is seen receiving Plaintext MPDU 812, which is parsed 813, and information elements 814 of MLD MAC Address, RK, PN and KeyID. The PN is shown being incremented 822, and directed to Construct nonce 818, and to Construct CCMP header 824. Construct CCMP header 824 outputs to an aggregation block 826.

A MAC header is taken from the Plaintext MPDU 812 and directed to aggregation block 826. The MAC header and MLD MAC Address are input to Construct AAD block 816 which outputs to CCM/GCM encryption block 820. A2, Priority and SCSID as well as MLD MAC address and incremented PN are input to Construct nonce block 818, whose output is directed to CCM/GCM encryption block 820. Data extracted from the Plaintext MPDU and Temporal Key (TK), are directed to CCM/GCM encryption block 820. Output from CCM/GCM encryption block 820 is seen as Data and MIC to the aggregation block 826 with the other inputs as described, and the Encrypted MPDU 828 is output.

In FIG. 33 the decapsulation 910 is seen receiving Encrypted MPDU 912 into a parser/demux 913, while additional element information 914 of MLD MAC Address, Key and Replay Counter are received.

A MAC header is extracted from the Encrypted MPDU and directed to aggregation block 922. The MAC header, as well as the received MLD MAC Address information, is received at a Construct AAD block 916 which outputs to the CCM/GCM decryption block 920. Information A2, Priority, SCSID, PN are extracted from the Encrypted MPDU directed to a Construct nonce block 918 along with the MLD MAC Address; with the Construct nonce block 918 outputting to the CCM/GCM decryption block 920. The information element Key is directly received at the CCM/GCM decryption block 920. The output of CCM/GCM decryption block 920 is data directed to aggregation block 922. A Replay check block 924 receives Replay Counter and PN information, as well as the output of aggregation block 922. Replay check block 924 outputs a plaintext MPDU 926.

FIG. 34 illustrates an example embodiment 950 of an AAD Construction for PV0 MPDU with LL control field, having subfields of FC, A1 through A3, SC, A4, QC, and LC. It will be noted that this differs from FIG. 4 in the addition of the LC subfield.

FIG. 35 illustrates an example embodiment 970 of a Nonce field for MPDU with LL control field, having the subfields of Nonce flags, STA MAC/MLD Address identified by A2, PN and SCSID. It will be noted that this example differs from FIG. 5 in the addition of the SCSID subfield.

If the encapsulation and decapsulation is for GCMP MPDU with LL control field, the nonce construction may not consider Priority and SCSID. Also, there is no Nonce Flags the Nonce field of FIG. 35.

10. General Scope of Embodiments

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multicore devices, and variations thereof.

From the description herein, it will be appreciated that the present disclosure encompasses multiple implementations of the technology which include, but are not limited to, the following:

An apparatus for wireless communication in a network, the apparatus comprising: (a) a wireless communication circuit, as a wireless station (STA) which is a separate STA or as a STA in a multiple-link device (MLD), and operating as either a regular STA or an Access Point (AP) STA, for wirelessly communicating with other wireless stations (STAs) using a carrier sense multiple access/collision avoidance (CSMA/CA) mechanism on a wireless local area network (WLAN); (b) a processor coupled to said wireless communication circuit for operating on the WLAN and performing transmission of frames between medium-access control (MAC) layers of the IEEE 802.11 network; (c) a non-transitory memory storing instructions executable by the processor for communicating with other STAs; and (d) wherein said instructions, when executed by the processor, perform steps of a wireless communications protocol for said wireless communication circuit, comprising: (d)(i) wherein the STA, operating as a receiver STA, receives at least one medium access control (MAC) service data units (MSDU) or an aggregated-MSDU (A-MSDU) with expiration time successfully from another STA operating as the transmitter STA; (d)(ii) wherein the receiver STA stores the MSDU or A-MSDU with expiration time in its receive reordering buffer of the corresponding high-throughput (HT)-immediate block acknowledgement (Ack) agreement;

and (d)(iii) wherein the receiver STA passes the MSDU or A-MSDU to a next MAC process before an expiration time of the MSDU or A-MSDU.

A method of performing wireless communication in a network, comprising: (a) operating a wireless communication circuit as a wireless station (STA) which is a separate STA or as a STA in a multiple-link device (MLD), and which operates as either a regular STA or an Access Point (AP) STA, for wirelessly communicating with other wireless stations (STAs) using a carrier sense multiple access/collision avoidance (CSMA/CA) mechanism on a wireless local area network (WLAN); (b) wherein the STA, operating as a receiver STA, receives at least one medium access control (MAC) service data units (MSDU) or an aggregated-MSDU (A-MSDU) with expiration time successfully from another STA operating as the transmitter STA; (c) wherein the receiver STA stores the MSDU or A-MSDU with expiration time in its receive reordering buffer of the corresponding high-throughput (HT)-immediate block acknowledgement (Ack) agreement; and (d) wherein the receiver STA passes the MSDU or A-MSDU to a next MAC process before an expiration time of the MSDU or A-MSDU.

A Wireless communication system/apparatus performing transmission of frames between the MAC layers of the IEEE 802.11 network, comprising: (a) the receiver STA receives a MSDU or A-MSDU with expiration time successfully from the transmitter STA; (b) the receiver STA stores the MSDU or A-MSDU with expiration time in its receive reordering buffer of the corresponding HT-immediate block ack agreement; and (c) the receiver STA passes the MSDU or A-MSDU to the next MAC process before the expiration time of the MSDU or A-MSDU.

The apparatus or method or system of any preceding or following implementation, wherein prior to a transmission, negotiations are performed between the receiver STA and the transmitter STA to determine expiration time of the MSDU or A-MSDU of a traffic stream.

The apparatus or method or system of any preceding or following implementation, wherein said negotiations are performed within a traffic stream (TS) or Stream classification service (SCS).

The apparatus or method or system of any preceding or following implementation, wherein the MSDU or A-MSDU with expiration time are traffic within an existing traffic stream (TS) or Stream classification service (SCS).

The apparatus or method or system of any preceding or following implementation, wherein the expiration time of each of said MSDUs or A-MSDU is embedded in its corresponding MPDU by the transmitter STA for receipt by the receiving STA.

The apparatus or method or system of any preceding or following implementation, wherein the expiration time of the MSDU or A-MSDU is expressed in conventional time units, indicating the time that the MSDU or A-MSDU can be stored in the receiver STAs reordering buffer after its arrival at the MAC layer of the receiver STA.

The apparatus or method or system of any preceding or following implementation, wherein the expiration time of the MSDU or A-MSDU is expressed as a timing synchronization function (TSF) time at which the MSDU or A-MSDU expires.

The apparatus or method or system of any preceding or following implementation, wherein the expiration time of the MSDU or A-MSDU is set to the latency bound of a traffic specification (TSPEC) element, or a quality-of-service (QoS) characteristics element for the MSDU or A-MSDU.

The apparatus or method or system of any preceding or following implementation, wherein where the expiration time of the MSDU or A-MSDU can be set to an MSDU lifetime value of the MSDU or A-MSDU which indicates the time that the MSDU or A-MSDU can be stored at the receive reordering buffer of the receiver STA upon it being received by the MAC layer of the receiver STA.

The apparatus or method or system of any preceding or following implementation, wherein the expiration time of the MSDU or A-MSDU can be set to the remaining time of an MSDU lifetime, or a latency bound, from a traffic specification (TSPEC) element, or a quality-of-service (QoS) characteristics element of the MSDU or A-MSDU indicating a time since the MSDU or A-MSDU is transmitted by the transmitter STA, or since it is received by the received STA.

The apparatus or method or system of any preceding or following implementation, wherein the receiver STA can store the MSDUs and A-MSDUs which include an expiration time, as well as the MSDUs or A-MSDUs which do not include an expiration time, in the same receive reordering buffer.

The apparatus or method or system of any preceding or following implementation, wherein the receiver STA stores MSDUs and A-MSDUs with different expiration times in the same receive reordering buffer.

The apparatus or method or system of any preceding or following implementation, wherein the receiver STA passes the MSDU or A-MSDU to the next MAC process at the expiration time of the MSDU or A-MSDU, even if it is not the first MSDU or A-MSDU in the receive reordering buffer.

The apparatus or method or system of any preceding or following implementation, wherein the receiver STA passes the MSDU or A-MSDU to the next MAC process at the expiration time of the MSDU or A-MSDU even if the sequence number of the MSDU or A-MSDU is not equal to a WinStartB parameter of the receive reordering buffer.

The apparatus or method or system of any preceding or following implementation, wherein the receiver STA passes the MSDU or A-MSDU to the next MAC process at a certain time period prior to the expiration time of the MSDU or A-MSDU even if it is not the first MSDU or A-MSDU in the receive reordering buffer.

The apparatus or method or system of any preceding or following implementation, wherein the receiver STA pass the MSDU or A-MSDU to the next MAC process a certain time period prior to the expiration time of the MSDU or A-MSDU even if the sequence number of the MSDU or A-MSDU is not equal to a WinStartB parameter of the receive reordering buffer.

The apparatus or method or system of any preceding or following implementation, wherein wherein the receiver STA is not allowed to pass the MSDU or A-MSDU to the next MAC process before the expiration time of the MSDU or A-MSDU if it is not the first MSDU or A-MSDU in the receive reordering buffer.

The apparatus or method or system of any preceding or following implementation, wherein the receiver STA is not allowed to pass the MSDU or A-MSDU to the next MAC process before the expiration time of the MSDU or A-MSDU, if the sequence number of the MSDU or A-MSDU is not equal to a WinStartB parameter of the receive reordering buffer.

The apparatus or method or system of any preceding or following implementation, wherein the receiver STA passes the MSDU or A-MSDU with expiration time to the next MAC process immediately after the MSDU or A-MSDU in the receive reordering buffer.

The apparatus or method or system of any preceding or following implementation, wherein the receiver STA passes the MSDU or A-MSDU to the next MAC process immediately after the MSDU or A-MSDU in the receive reordering buffer if it is the first MSDU or A-MSDU with expiration time in the receive reordering buffer and the other expected MSDUs or A-MSDUs in the receive reordering buffer do not have expiration times.

The apparatus or method or system of any preceding or following implementation, wherein the receiver STA passes the MSDU or A-MSDU to the next MAC process immediately after the MSDU or A-MSDU in the receive reordering buffer, if it is the first MSDU or A-MSDU of a traffic stream in the receive reordering buffer.

The apparatus or method or system of any preceding or following implementation, wherein the transmitter STA and receiver STA perform prior negotiation about the expiration time of the MSDU or A-MSDU of a traffic stream, such as TS or SCS traffic stream.

The apparatus or method or system of any preceding or following implementation, wherein the MSDU or A-MSDU with expiration time can be the traffic of an existing TS or SCS traffic stream only.

The apparatus or method or system of any preceding or following implementation, wherein the transmitter STA embeds the expiration time of the MSDU or A-MSDU in the corresponding MPDU when it transmits the corresponding MPDU to the receiver STA.

The apparatus or method or system of any preceding or following implementation, wherein the expiration time of the MSDU or A-MSDU is a time in unit, such as seconds, milli-seconds, micro-seconds, that the MSDU or A-MSDU can be stored at the receive reordering buffer of the receiver STA since it arrives at the MAC layer of the receiver STA.

The apparatus or method or system of any preceding or following implementation, wherein the expiration time of the MSDU or A-MSDU is set to the TSF time that the MSDU or A-MSDU expires.

The apparatus or method or system of any preceding or following implementation, wherein the expiration time of the MSDU or A-MSDU is set to the latency bound of the TSPEC element (or QoS characteristics element) of the MSDU or A-MSDU.

The apparatus or method or system of any preceding or following implementation, wherein the expiration time of the MSDU or A-MSDU is set to the MSDU lifetime of the MSDU or A-MSDU which indicates the time that the MSDU or A-MSDU can be stored at the receive reordering buffer of the receiver STA since it is received by (the MAC layer of) the received STA.

The apparatus or method or system of any preceding or following implementation, wherein the expiration time of the MSDU or A-MSDU is set to the remaining time of the MSDU lifetime (or the latency bound) of the TSPEC element (or QoS characteristics element) of the MSDU or A-MSDU since the MSDU or A-MSDU is transmitted by the transmitted STA (or since it is received by the received STA).

The apparatus or method or system of any preceding or following implementation, wherein the receiver STA stores the MSDUs and A-MSDUs with expiration time and the MSDUs or A-MSDUs without expiration time in the same receive reordering buffer.

The apparatus or method or system of any preceding or following implementation, wherein the receiver STA stores the MSDUs and A-MSDUs with different expiration times in the same receive reordering buffer.

The apparatus or method or system of any preceding or following implementation, wherein the receiver STA passes the MSDU or A-MSDU to the next MAC process at the expiration time of the MSDU or A-MSDU even if it is not the first MSDU or A-MSDU in the receive reordering buffer.

The apparatus or method or system of any preceding or following implementation, wherein the receiver STA passes the MSDU or A-MSDU to the next MAC process at the expiration time of the MSDU or A-MSDU even if the sequence number of the MSDU or A-MSDU is not equal to the WinStartB parameter of the receive reordering buffer.

The apparatus or method or system of any preceding or following implementation, wherein the receiver STA passes the MSDU or A-MSDU to the next MAC process a certain time (e.g., several milli-seconds) before the expiration time of the MSDU or A-MSDU even if it is not the first MSDU or A-MSDU in the receive reordering buffer.

The apparatus or method or system of any preceding or following implementation, wherein the receiver STA passes the MSDU or A-MSDU to the next MAC process a certain time (e.g., several milli-seconds) before the expiration time of the MSDU or A-MSDU even if the sequence number of the MSDU or A-MSDU is not equal to the WinStartB parameter of the receive reordering buffer.

The apparatus or method or system of any preceding or following implementation, wherein the receiver STA is not allowed to pass the MSDU or A-MSDU to the next MAC process before the expiration time of the MSDU or A-MSDU if it is not the first MSDU or A-MSDU in the receive reordering buffer.

The apparatus or method or system of any preceding or following implementation, wherein the receiver STA is not allowed to pass the MSDU or A-MSDU to the next MAC process before the expiration time of the MSDU or A-MSDU if the sequence number of the MSDU or A-MSDU is not equal to the WinStartB parameter of the receive reordering buffer.

The apparatus or method or system of any preceding or following implementation, wherein the receiver STA passes the MSDU or A-MSDU with expiration time to the next MAC process immediately after the MSDU or A-MSDU in the receive reordering buffer.

The apparatus or method or system of any preceding or following implementation, wherein the receiver STA passes the MSDU or A-MSDU to the next MAC process immediately after the MSDU or A-MSDU in the receive reordering buffer if it is the first MSDU or A-MSDU with expiration time in the receive reordering buffer and the other expected MSDUs or A-MSDUs in the receive reordering buffer do not have expiration time.

The apparatus or method or system of any preceding or following implementation, wherein the receiver STA passes the MSDU or A-MSDU to the next MAC process immediately after the MSDU or A-MSDU in the receive reordering buffer if it is the first MSDU or A-MSDU of a traffic stream, such as TS or SCS traffic stream, in the receive reordering buffer.

As used herein, term "implementation" is intended to include, without limitation, embodiments, examples, or other forms of practicing the technology described herein.

As used herein, the singular terms "a," "an," and "the" may include plural referents unless the context clearly dictates otherwise. Reference to an object in the singular is not intended to mean "one and only one" unless explicitly so stated, but rather "one or more."

Phrasing constructs, such as "A, B and/or C", within the present disclosure describe where either A, B, or C can be present, or any combination of items A, B and C. Phrasing constructs indicating, such as "at least one of" followed by listing a group of elements, indicates that at least one of these group elements is present, which includes any possible combination of the listed elements as applicable.

References in this disclosure referring to "an embodiment", "at least one embodiment" or similar embodiment wording indicates that a particular feature, structure, or characteristic described in connection with a described embodiment is included in at least one embodiment of the present disclosure. Thus, these various embodiment phrases are not necessarily all referring to the same embodiment, or to a specific embodiment which differs from all the other embodiments being described. The embodiment phrasing should be construed to mean that the particular features, structures, or characteristics of a given embodiment may be combined in any suitable manner in one or more embodiments of the disclosed apparatus, system or method.

As used herein, the term "set" refers to a collection of one or more objects. Thus, for example, a set of objects can include a single object or multiple objects.

Relational terms such as first and second, top and bottom, upper and lower, left and right, and the like may be used solely to distinguish one entity or action from another entity or action without necessarily requiring or implying any actual such relationship or order between such entities or actions.

The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element.

As used herein, the terms "approximately", "approximate", "substantially", "essentially", and "about", or any other version thereof, are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

The term "coupled" as used herein is defined as connected, although not necessarily directly and not necessarily mechanically. A device or structure that is "configured" in a certain way is configured in at least that way, but may also be configured in ways that are not listed.

Benefits, advantages, solutions to problems, and any element(s) that may cause any benefit, advantage, or solution to occur or become more pronounced are not to be construed as a critical, required, or essential features or elements of the technology describes herein or any or all the claims.

In addition, in the foregoing disclosure various features may be grouped together in various embodiments for the purpose of streamlining the disclosure. This method of disclosure is not to be interpreted as reflecting an intention that the claimed embodiments require more features than are expressly recited in each claim. Inventive subject matter can lie in less than all features of a single disclosed embodiment.

The abstract of the disclosure is provided to allow the reader to quickly ascertain the nature of the technical disclosure. It is submitted with the understanding that it will not be used to interpret or limit the scope or meaning of the claims.

It will be appreciated that the practice of some jurisdictions may require deletion of one or more portions of the disclosure after that application is filed. Accordingly the reader should consult the application as filed for the original content of the disclosure. Any deletion of content of the disclosure should not be construed as a disclaimer, forfeiture or dedication to the public of any subject matter of the application as originally filed.

The following claims are hereby incorporated into the disclosure, with each claim standing on its own as a separately claimed subject matter.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. An apparatus for wireless communication in a network, the apparatus comprising:
   (a) a wireless communication circuit, as a wireless station (STA) which is a separate STA or as a STA in a multiple-link device (MLD), and operating as either a regular STA or an Access Point (AP) STA, for wirelessly communicating with other wireless stations (STAs) using a carrier sense multiple access/collision avoidance (CSMA/CA) mechanism on an IEEE 802.11 wireless local area network (WLAN);
   (b) a processor coupled to said wireless communication circuit for operating on the WLAN and performing transmission of frames between a medium-access control (MAC) layer of a transmitter STA and a MAC layer of a receiving STA over the network;
   (c) a non-transitory memory storing instructions executable by the processor for communicating with other STAs; and
   (d) wherein said instructions, when executed by the processor, perform steps of a wireless communications protocol for said wireless communication circuit, comprising:
      (i) wherein the STA receives and stores each received MAC service data unit (MSDU) and each aggregated-MSDU (A-MSDU) in its receive reordering buffer according to its sequence number which is not assigned in order of increasing expiration time;
      (ii) wherein the STA, operating as a receiver STA, successfully receives at least one MAC service data unit (MSDU) or an aggregated-MSDU (A-MSDU), with an expiration time from another STA operating as the transmitter STA;
      (iii) wherein the receiver STA stores the MSDU or A-MSDU with the expiration time in its receive reordering buffer of the corresponding high-throughput (HT)-immediate block acknowledgement (Ack) agreement; and
      (iv) wherein responsive to determining that the MSDU or A-MSDU with the expiration time is expiring the receiver STA, instead of passing another MSDU or A-MSDU from the receive reordering buffer which has the smallest sequence number, the receiver STA instead passes the MSDU or A-MSDU whose expiration time is expiring to a next MAC process.

2. The apparatus of claim 1, wherein prior to a transmission, negotiations are performed between the receiver STA and the transmitter STA to determine the expiration time of the MSDU or A-MSDU of a traffic stream.

3. The apparatus of claim 2, wherein said negotiations are performed within a traffic stream (TS) or Stream classification service (SCS).

4. The apparatus of claim 1, wherein the MSDU or A-MSDU, with the expiration time, are traffic within an existing traffic stream (TS) or Stream classification service (SCS).

5. The apparatus of claim 1, wherein the expiration time of each of said MSDUs or A-MSDU is embedded in its corresponding MPDU by the transmitter STA for receipt by the receiving STA.

6. The apparatus of claim 1, wherein the expiration time of the MSDU or A-MSDU is expressed in conventional time units, indicating the time that the MSDU or A-MSDU can be stored in the receiver STAs reordering buffer after its arrival at the MAC layer of the receiver STA.

7. The apparatus of claim 1, wherein the expiration time of the MSDU or A-MSDU is expressed as a timing synchronization function (TSF) time at which the MSDU or A-MSDU expires.

8. The apparatus of claim 1, wherein the expiration time of the MSDU or A-MSDU is set to a latency bound of a traffic specification (TSPEC) element, or a quality-of-service (QoS) characteristics element for the MSDU or A-MSDU.

9. The apparatus of claim 1, wherein where the expiration time of the MSDU or A-MSDU can be set to an MSDU lifetime value of the MSDU or A-MSDU which indicates the time that the MSDU or A-MSDU can be stored at the receive reordering buffer of the receiver STA upon it being received by the MAC layer of the receiver STA.

10. The apparatus of claim 1, wherein the expiration time of the MSDU or A-MSDU can be set to the remaining time of an MSDU lifetime, or a latency bound, from a traffic specification (TSPEC) element, or a quality-of-service (QoS) characteristics element of the MSDU or A-MSDU indicating a time since the MSDU or A-MSDU is transmitted by the transmitter STA, or since it is received by the received STA.

11. The apparatus of claim 1, wherein the receiver STA can store the MSDUs and A-MSDUs which include an expiration time, as well as the MSDUs or A-MSDUs which do not include an expiration time, in the same receive reordering buffer.

12. The apparatus of claim 1, wherein the receiver STA stores MSDUs and A-MSDUs with different expiration times in the same receive reordering buffer.

13. The apparatus of claim 1, wherein the receiver STA passes the MSDU or A-MSDU to the next MAC process at the expiration time of the MSDU or A-MSDU, even if it is not the first MSDU or A-MSDU in the receive reordering buffer.

14. The apparatus of claim 1, wherein the receiver STA passes the MSDU or A-MSDU to the next MAC process at the expiration time of the MSDU or A-MSDU even if a sequence number of the MSDU or A-MSDU is not equal to a WinStartB parameter of the receive reordering buffer.

15. The apparatus of claim 1, wherein the receiver STA passes the MSDU or A-MSDU to the next MAC process at a certain time period prior to the expiration time of the MSDU or A-MSDU even if it is not the first MSDU or A-MSDU in the receive reordering buffer.

16. The apparatus of claim 1, wherein the receiver STA pass the MSDU or A-MSDU to the next MAC process a certain time period prior to the expiration time of the MSDU or A-MSDU even if a sequence number of the MSDU or A-MSDU is not equal to a WinStartB parameter of the receive reordering buffer.

17. The apparatus of claim 1, wherein the receiver STA is not allowed to pass the MSDU or A-MSDU to the next MAC process before the expiration time of the MSDU or A-MSDU if it is not the first MSDU or A-MSDU in the receive reordering buffer.

18. The apparatus of claim 1, wherein the receiver STA is not allowed to pass the MSDU or A-MSDU to the next MAC process before the expiration time of the MSDU or A-MSDU, if a sequence number of the MSDU or A-MSDU is not equal to a WinStartB parameter of the receive reordering buffer.

19. The apparatus of claim 1, wherein the receiver STA passes the MSDU or A-MSDU with expiration time to the next MAC process immediately after the MSDU or A-MSDU in the receive reordering buffer.

20. The apparatus of claim 1, wherein the receiver STA passes the MSDU or A-MSDU to the next MAC process immediately after the MSDU or A-MSDU in the receive reordering buffer if it is the first MSDU or A-MSDU with expiration time in the receive reordering buffer and the other expected MSDUs or A-MSDUs in the receive reordering buffer do not have expiration times.

21. The apparatus of claim 1, wherein the receiver STA passes the MSDU or A-MSDU to the next MAC process immediately after the MSDU or A-MSDU in the receive reordering buffer, if it is the first MSDU or A-MSDU of a traffic stream in the receive reordering buffer.

22. A method of performing wireless communication in a network, comprising:

(a) operating a wireless communication circuit as a wireless station (STA) which is a separate STA or as a STA in a multiple-link device (MLD), and which operates as either a regular STA or an Access Point (AP) STA, for wirelessly communicating with other wireless stations (STAs) using a carrier sense multiple access/collision avoidance (CSMA/CA) mechanism on an IEEE 802.11 wireless local area network (WLAN);

(b) wherein the STA receives and stores each received MAC service data unit (MSDU) and each aggregated-MSDU (A-MSDU) in its receive reordering buffer according to its sequence number which is not assigned in order of increasing expiration time;

(c) wherein the STA, operating as a receiver STA, successfully receives at least one medium access control (MAC) service data unit (MSDU) or an aggregated-MSDU (A-MSDU) with expiration time from another STA operating as the transmitter STA;

(d) wherein the receiver STA stores the MSDU or A-MSDU with the expiration time in its receive reordering buffer of the corresponding high-throughput (HT)-immediate block acknowledgement (Ack) agreement; and (e) wherein responsive to determining that the MSDU or A-MSDU with the expiration time is expiring the receiver STA, instead of passing another MSDU or A-MSDU from the receive reordering buffer which has the smallest sequence number, the receiver STA instead passes the MSDU or A-MSDU whose expiration time is expiring to a next MAC process.

\* \* \* \* \*